(12) United States Patent
Shinohara

(10) Patent No.: US 8,796,877 B2
(45) Date of Patent: Aug. 5, 2014

(54) LIQUID POWER GENERATION APPARATUS AND LIQUID POWER GENERATION SYSTEM

(71) Applicant: Tooru Shinohara, Kanagawa-ken (JP)

(72) Inventor: Tooru Shinohara, Kanagawa-ken (JP)

( * ) Notice: Subject to any disclaimer, the term of this patent is extended or adjusted under 35 U.S.C. 154(b) by 0 days.

(21) Appl. No.: 13/688,360

(22) Filed: Nov. 29, 2012

(65) Prior Publication Data

US 2013/0154270 A1 Jun. 20, 2013

(30) Foreign Application Priority Data

Nov. 30, 2011 (JP) ................................ P2011-262761
May 25, 2012 (JP) ................................ P2012-120255

(51) Int. Cl.
*F03B 13/00* (2006.01)

(52) U.S. Cl.
USPC ............................................. 290/54; 60/495

(58) Field of Classification Search
CPC ...................................................... F03B 13/00
USPC ......................................................... 290/54
See application file for complete search history.

(56) References Cited

U.S. PATENT DOCUMENTS

| | | | |
|---|---|---|---|
| 474,238 A * | 5/1892 | Gardner | 60/640 |
| 479,291 A * | 7/1892 | Marsh | 60/640 |
| 1,822,806 A * | 9/1931 | Geary | 60/507 |
| 2,239,064 A * | 4/1941 | Tower | 60/640 |
| 7,777,359 B1 * | 8/2010 | Gibson | 290/54 |
| 8,004,103 B2 * | 8/2011 | Brantingham | 290/53 |
| 8,080,892 B2 * | 12/2011 | Juneau | 290/53 |
| 8,125,097 B1 * | 2/2012 | Lomerson et al. | 290/53 |
| 8,297,055 B2 * | 10/2012 | Ackman | 60/640 |
| 2006/0091677 A1 * | 5/2006 | Greene | 290/54 |
| 2007/0152450 A1 * | 7/2007 | Chiu | 290/54 |
| 2011/0120109 A1 * | 5/2011 | McGillis | 60/502 |

FOREIGN PATENT DOCUMENTS

| | | | |
|---|---|---|---|
| EP | 2557310 A2 * | 2/2013 | |
| JP | 2005090470 A | 4/2005 | |
| JP | 2005256830 A | 9/2005 | |

* cited by examiner

*Primary Examiner* — Joseph Waks
(74) *Attorney, Agent, or Firm* — Honigman Miller Schwartz and Cohn LLP

(57) ABSTRACT

A liquid power generation apparatus includes a movable liquid tank, a linear-rotation conversion mechanism, liquid introducing device, controlling device, liquid discharging device, liquid tank returning device, and a generator. The movable liquid tank can vertically move. The linear-rotation conversion mechanism includes a male screw shaft and a female screw body and generates a rotation output in tandem with the vertical movement of the movable liquid tank. The liquid introducing device introduces a liquid when the movable liquid tank is provided at an upper position. The controlling device moves down the movable liquid tank having the liquid therein from the upper position. The liquid discharging device discharges the liquid when the movable liquid tank is lowered. The liquid tank returning device moves up the lowered movable liquid tank and returns it to its original position. The generator generates electricity by using a rotation output from the linear-rotation conversion mechanism.

8 Claims, 14 Drawing Sheets

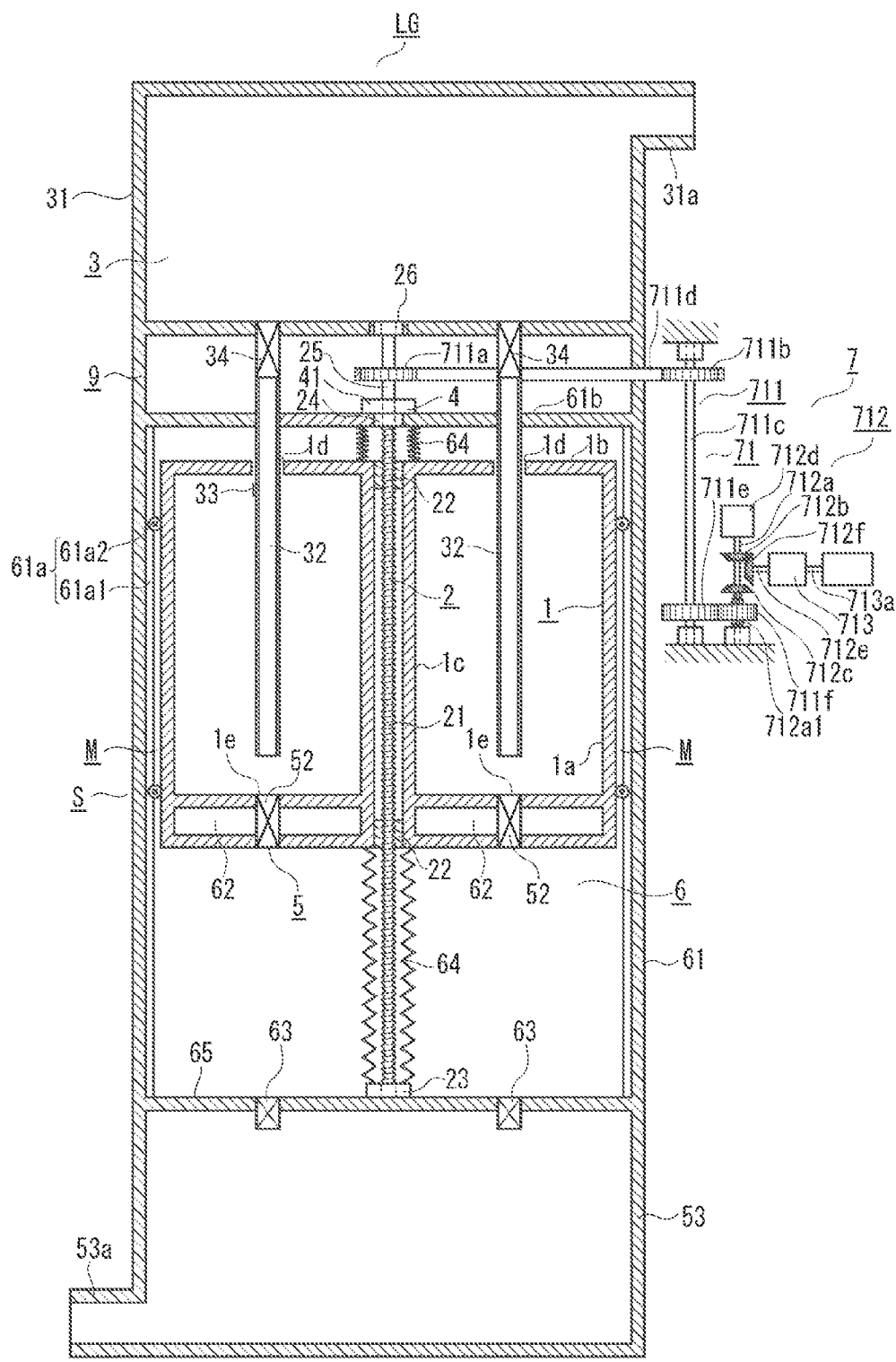

FIG.11

| OPERATION CYCLE | First Time | | | | Second Time | | | | Third Time | | | | Fourth Time | | | | Fifth Time | | | |
|---|---|---|---|---|---|---|---|---|---|---|---|---|---|---|---|---|---|---|---|---|
| TIME UNIT (15seconds) | 1 | 2 | 3 | 4 | 5 | 6 | 7 | 8 | 9 | 10 | 11 | 12 | 13 | 14 | 15 | 16 | 17 | 18 | 19 | 20 |
| WATER SUPPLY | O | | | | O | | | | O | | | | O | | | | O | | | |
| GENERATION(FALLING) | | O | O | O | | O | O | O | | O | O | O | | O | O | O | | O | O | O |
| DRAINAGE | O | | | | O | | | | O | | | | O | | | | O | | | |

(a)

| OPERATION CYCLE | First Time | | | | Second Time | | | | Third Time | | | | Fourth Time | | | | Fifth Time | | | |
|---|---|---|---|---|---|---|---|---|---|---|---|---|---|---|---|---|---|---|---|---|
| TIME UNIT (15seconds) | 1 | 2 | 3 | 4 | 5 | 6 | 7 | 8 | 9 | 10 | 11 | 12 | 13 | 14 | 15 | 16 | 17 | 18 | 19 | 20 |
| WATER SULLY | O | | | | O | | | | O | | | | O | | | | O | | | |
| GENERATION(FALLING) | | O | O | O | | O | O | O | | O | O | O | | O | O | O | | O | O | O |
| DRAINAGE | O | | | | O | | | | O | | | | O | | | | O | | | |
| WATER CIRCURATION | O | O | O | O | O | O | O | O | O | O | O | O | O | O | O | O | O | O | O | O |

LIQUID POWER GENERATION APPARATUS AND LIQUID POWER GENERATION SYSTEM

BACKGROUND OF THE INVENTION

1. Field of the Invention

The present invention relates to a liquid power generation apparatus that utilizes a liquid such as water and generates electricity and to a liquid power generation system using this apparatus.

2. Description of the Related Art

A water receiving tank is connected to a balancer through a belt, an intermediate portion of the belt is hoisted by a pulley, and the pulley is disposed to a rotary shaft of a generator. Further, when the water receiving tank is placed at an upper position, water is injected from the water tank through a volume regulating faucet. As a result, a weight of the water receiving tank exceeds that of the balancer, the water receiving tank is heavier than the balancer, and hence the water receiving tank is moved down. When the water receiving tank reaches the ground, a projection provided on a lower surface of a lid constituting a bottom of the water receiving tank is pushed upward. As a result, since the water in the water receiving tank is discharged and the weight of the water receiving tank is reduced, the weight of the balancer is larger, and hence the water receiving tank is pulled up and restored to its original state. The above-described operations are repeated. The upward and downward movements of the water receiving tank enable the belt to rotate the pulley, and hence the generator is driven and can generate electricity.

In the above-described configuration, when a second water receiving tank is used in place of the balancer and the water is alternately injected into the two water receiving tanks through the volume regulating faucet, the electricity can be also generated during the upward movement as well as the downward movement of each water receiving tank.

Patent Document 1: Japanese Unexamined Patent Application Publication No. 2005-090470

Patent Document 2: Japanese Unexamined Patent Application Publication No. 2005-256830

However, in any conventional technology mentioned above, in order to obtain a necessary number of revolutions of the pulley and a necessary generating time, a moving distance of the water receiving tank must be set to a height of, e.g., 10 m, and hence a size of the apparatus is increased. Therefore, an installing place is limited, and an electricity generating capacity to be obtained is small with respect to an increase in size of the apparatus.

Furthermore, in order to generate electricity during the upward movement following the downward movement of the water receiving tank, the two water tanks must be distributed and disposed at both ends of the belt, and the water must be alternately injected. In this regard, an increase in size of the apparatus is also encouraged, and an installing place is limited.

Furthermore, since a movable portion is exposed to the outside, not only the apparatus cannot be installed at a position that a person can approach, but also noise during operations can be a problem, and carriage, assembling, and installation are apt to bring difficulties.

SUMMARY OF THE INVENTION

It is an object of the present invention to provide a liquid power generation apparatus that has a simple and compact configuration, can efficiently convert linear motion into rotary motion, has high reliability of operations, facilitates adoption of a closed configuration that is integrated in whole, and can be readily adapted to various liquid sources and various generating capacities, and also provide a liquid power generation system using this apparatus.

A liquid power generation apparatus according to the present invention comprises a movable liquid tank, a linear-rotation conversion mechanism, liquid introducing means, controlling means, liquid discharging means, movable liquid tank returning means, and generator. The movable liquid tank can move up and down. The linear-rotation conversion mechanism comprises a male screw shaft and a female screw body screwed with respect to the male screw shaft, any one of the male screw shaft and the female screw body is displaced in an axial direction in tandem with the movable liquid tank, and the other generates a rotation output. The liquid introducing means introduces a liquid into the movable liquid tank when the movable liquid tank is placed at an upper position. The controlling means moves down the movable liquid tank having the liquid introduced therein from the upper position. The liquid discharging means discharges the inner liquid when the movable liquid tank moves down. The movable liquid tank returning means moves up the movable liquid tank which has been moved down and from which the liquid has been discharged, and returns it to its original position. The generator is driven by a desired rotation output of the linear-rotation conversion mechanism and generates electricity.

According to the liquid power generation apparatus of the present invention, when the movable liquid tank with a predetermined mass having the liquid introduced therein is moved down to a predetermined position, the downward movement of the movable liquid tank is converted into torque and electricity is generated by using the linear-rotation conversion mechanism comprising the male screw shaft and the female screw body screwed with respect to the male screw shaft. Therefore, it is possible to provide the liquid power generation apparatus that has a simple and compact configuration as a whole, enables efficiently converting the linear motion into rotary motion, has high reliability of operations, facilitates adopting a closed configuration that is integrated as a whole, and can be readily adapted to various liquid sources and various generation capabilities, and also provide the liquid power generation system using this apparatus.

BRIEF DESCRIPTION OF THE DRAWINGS

FIG. 5 is a front longitudinal cross-sectional view according to a second embodiment of a liquid power generation apparatus of the present invention;

FIG. 11 is a timing chart for explaining a generating operation of the liquid power generation apparatus according to the same;

FIG. 15 is a timing chart for explaining a linkage operation of each liquid power generation apparatus according to the first embodiment of a liquid power generation system.

DETAILED DESCRIPTION OF THE PREFERRED EMBODIMENTS

[First Embodiment of Liquid Power Generation Apparatus]

Figure 1:
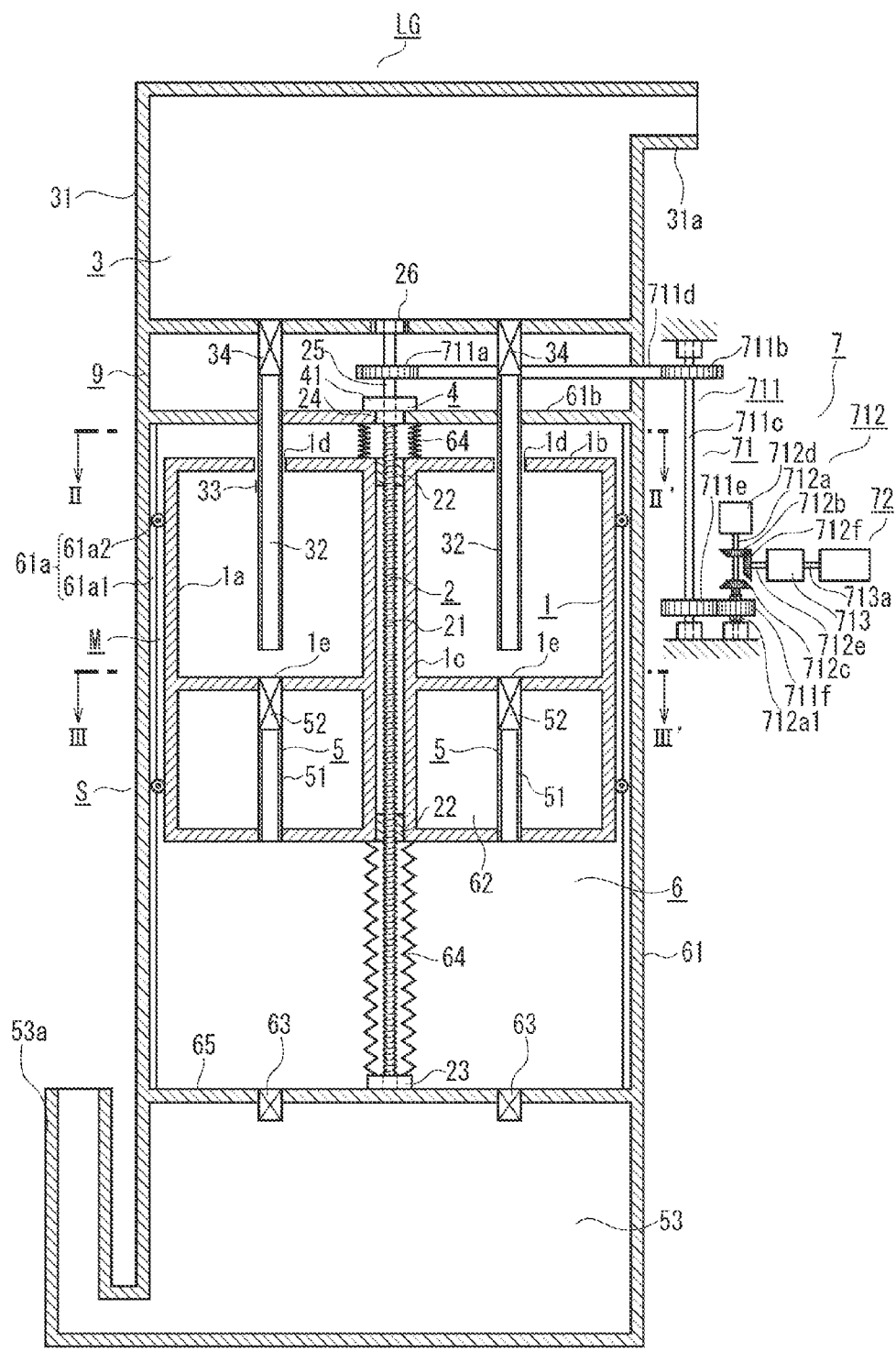
FIG. 1 is a front longitudinal cross-sectional view according to a first embodiment of a liquid power generation apparatus of the present invention.

In a first embodiment, as shown in FIG. 1, a liquid power generation apparatus LG comprises a movable liquid tank 1, a linear-rotation conversion mechanism 2, liquid introducing means 3, controlling means 4, liquid discharging means 5, movable liquid tank returning means 6, and generator 7. This embodiment is obtained by embodying a liquid power generation apparatus according to the present invention, and it can be used as one element constituting a system in case of embodying a liquid power generation system of the present invention. A configuration and an operation of each constituent element will now be described hereinafter with reference to FIG. 1 to FIG. 4. It is to be noted that a liquid optimally means water (including tap water, industrial water, seawater, and others), but it may be, e.g., alcohols, oils, a liquefied gas, or liquid nitrogen.

[Movable Liquid Tank 1]

As shown in FIG. 1, the movable liquid tank 1 is arranged so as to enable upward and downward movement thereof. Moreover, a liquid is introduced into this tank, and this liquid can be stored during at least downward movement. Additionally, a predetermined mass required for generation can be obtained and the downward movement can be carried out while storing the liquid in the tank. Further, the liquid stored inside is discharged at a time of the upward movement, and then the tank can return to its original position.

Furthermore, the movable liquid tank 1 can be made of an appropriate material. For example, it is possible to use FRP (reinforced plastics), a metal, a ceramic material, or wood. However, in order to reduce motion energy as much as possible when the tank is moved down to a predetermined position, then moved up, and returned to its original generation start position or in order to enable generation at a time of the upward movement of the movable liquid tank, a lightweight of the movable liquid tank 1 is preferable, and making this tank by using FRP, a light metal, and SUS (stainless steel) as a main material is preferable. Contrarily, in order to reduce an amount of the liquid used at a time of the downward movement of the movable liquid tank 1 as much as possible and generate a desired amount of electricity, setting the mass of the movable liquid tank 1 to be large within the acceptable range is preferable. To set the movable liquid tank 1 to a desired mass, not only setting a material and/or a wall thickness of the movable liquid tank 1 to a desired value is allowed, but also adding a ballast to the movable liquid tank 1 as desired is allowed. It is to be noted that, as a reinforced fiber used in the FRP, an inorganic fiber of glass, carbon, or a metal oxide can be used. Moreover, as the light metal, it is possible to use aluminum (Al), titanium (Ti), and magnesium (Ma) or an alloy containing one or more of these materials as components.

Additionally, an internal volume and a shape of the movable liquid tank 1 are not restricted in particular. Further, an appropriate internal volume, or an area of the movable liquid tank 1 as seen in a planar view, e.g., a diameter and a height can be appropriately selected in accordance with a generating capacity.

In the illustrated embodiment, the movable liquid tank 1 has a main body portion 1a and a lid portion 1b and also comprises a through portion 1c so as to surround a position of the center of gravity, and it has a discoid shape or a donut-like shape having a slightly deformed hole of the through portion 1c as a whole. It is to be noted that the inside of the through portion 1c is provided outside the movable liquid tank 1, and the later-described linear-rotation conversion mechanism 2 is preferably inserted into the through portion 1c so as not to come into contact with the liquid. Moreover, the lid portion 1b can be configured to be attachable to/detachable from the main body portion 1a for the maintenance of the inside of the movable liquid tank 1.

Additionally, in order to introduce the liquid into the tank prior to the downward movement and discharge the liquid in the tank after end of the downward movement, the movable liquid tank 1 has a liquid introducing hole 1d and a liquid discharging hole 1e. In the illustrated embodiment, the liquid introducing hole 1d is formed in the lid portion 1b. Further, the liquid discharging hole 1e is formed in a bottom portion of the main body portion 1a. It is to be noted that an appropriate opening space and an appropriate number can be set with respect to each of the liquid introducing hole 1d and the liquid discharging hole 1e in order to achieve smooth liquid introduction/discharge at a desired speed. In the illustrated embodiment, the four liquid introducing holes 1d and the four liquid discharging holes 1e are formed at intervals of 90° around the position of the center of gravity.

[Linear-rotation Conversion Mechanism 2]

The linear-rotation conversion mechanism is means for converting at least the downward movement of the movable liquid tank 1 into torque, and it is configured with a male screw shaft 21 and a female screw body 22 screwed with respect to this male screw shaft 21. Further, one of the male screw shaft 21 and the female screw body is disposed to the movable liquid tank 1 and thereby interlocks with the movable liquid tank 1 but does not rotate, and the other is stopped at a fixing position but rotatably supported. That is, in the present invention, the linear-rotation conversion mechanism 2 functions as a mechanism that converts the linear motion at a time of at least the downward movement of the movable liquid tank 1 into the rotary motion. Then, when a rotation output, i.e., torque from the linear-rotation conversion mechanism 2 is transmitted to the later-described generator 7, the generator can be driven, and the electricity can be generated.

A position to the movable liquid tank 1 at which the linear-rotation conversion mechanism 2 is arranged is not generally restricted in particular in the present invention. However, this position is preferably the center of gravity of the movable liquid tank 1. When the linear-rotation conversion mechanism 2 is arranged at the center of gravity in this manner, using the single linear-rotation conversion mechanism 2 alone can suffice, and an operation of the linear-rotation conversion mechanism 2 is stabilized the most.

Figure 4A:
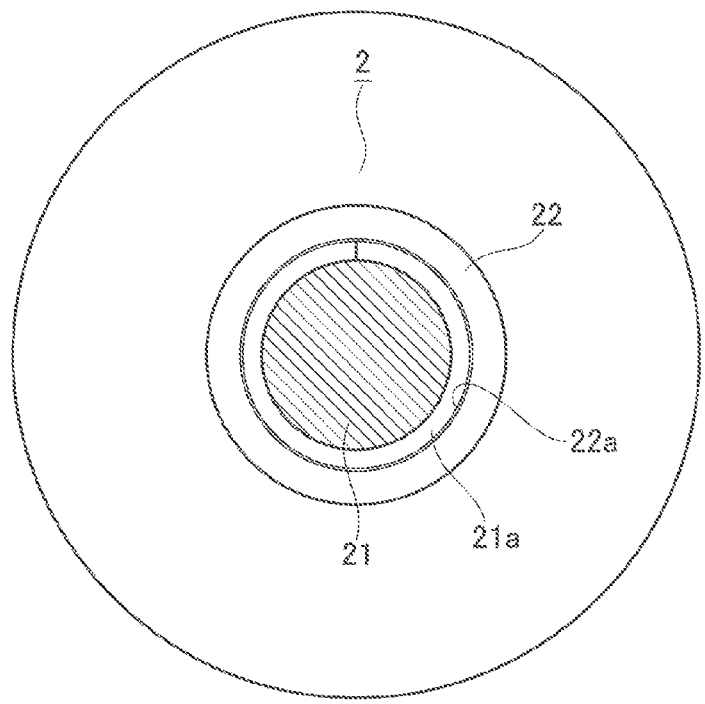
FIG. 4A is an enlarged transverse cross-sectional view showing a linear-rotation conversion mechanism.
Figure 4B:
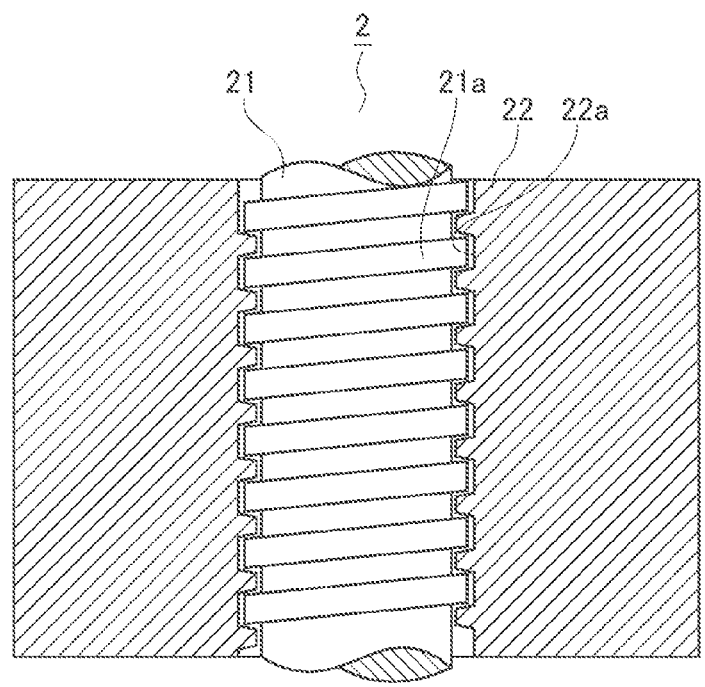
FIG. 4B is an enlarged longitudinal cross-sectional view of a primary part showing the same.

In the illustrated embodiment, as shown in FIG. 1, both ends of the male screw shaft 21 are rotatably supported by bearings 23 and 24 at fixed positions, and a male screw groove 21a is continuously formed on an intermediate portion with an effective length of this shaft as shown in FIG. 4B in an enlarged manner. Further, in the illustrated embodiment, a rotary shaft 25, i.e., a pulley shaft having a coaxial relationship is integrally extended upward from an upper end of the male screw shaft 21. As shown in FIG. 1, this rotary shaft 25 has an upper end supported by a bearing 26 and an outer periphery having no male screw groove 21a formed thereon, and a later-described first pulley 711a is installed on an intermediate portion of the rotary shaft 25.

As can be understood from the enlarged view of FIG. 4A, the female screw body 22 has a through hole formed at the center thereof and also has a female screw groove 22a formed on an inner surface thereof, and hence it can be called a nut. Further, the female screw groove 22a of the female screw body 22 is screwed in the male screw groove 21a of the male screw shaft 21, and it can slide and move along a longitudinal direction of the male screw shaft 21 when it is free from the male screw shaft 21. It is to be noted that, when the female screw body 22 slides along the male screw shaft 41 without rotating, the male screw shaft 41 rotates.

A lead angle of each of the male screw groove 21a of the male screw shaft 21 and the female screw groove 22a of the female screw body 22 is not restricted in particular in the present invention. When the lead angle is relatively large, skid resistance (frictional resistance) is relatively small, and the number of revolutions obtained per unit linear distance is small, but torque is relatively large. Contrarily, when the lead angle is relatively small, the skid resistance (the frictional resistance) is relatively large, and the number of revolutions obtained per unit linear distance is relatively large, but the torque per revolution to be obtained is relatively small. However, it is well known that, in the linear-rotation conversion mechanism 2, the female screw groove 22a of the female screw body 22 can be formed to interpose a ball bearing, and a known ball screw or the like that reduces the skid resistance can be adopted. Further, when this means is adopted as desired, the skid resistance is considerably reduced, and hence the number of revolutions to be obtained per unit linear distance can be relatively increased together with the torque even though the lead angle of each of the male screw shaft 21 and the female screw body 22 is relatively small. Therefore, considering the above-described circumstances, in this embodiment, an angle that is not smaller than approximately 10° can suffice as the lead angle of each of the male screw shaft 21 and the female screw body 22. However, the angle preferably falls within the range of approximately 15 to 25°.

Furthermore, the linear-rotation conversion mechanism 2 is allowed to be arranged on either the inner side or the outer side of the movable liquid tank 1 as described above. When this mechanism is arranged in the water tank 1, the configuration of the hydraulic power generation apparatus LG becomes simple. Moreover, for example, as shown in FIG. 1, when this mechanism is arranged outside the movable liquid tank 1, since the mechanism can be prevented from coming into contact with a liquid, durability of the linear-rotation conversion mechanism 2 is increased, and not only its maintenance can be facilitated, but also the liquid is no longer contaminated by an operation of the linear-rotation conversion mechanism 2.

Additionally, in the linear-rotation conversion mechanism 2, when the female screw body 22 interlocks with the vertical linear movement of the movable liquid tank 1 at an interlocking ratio of 1:1, an effective length of the male screw shaft 21 equal to a vertical linear movement distance of the movable liquid tank 1 can suffice. However, like a situation where the female screw body 22 interlocks with the linear movement of the movable liquid tank 1 trough, e.g., a link mechanism or a lever mechanism, when the interlocking ratio of the movable liquid tank 1 and the female screw body 22 is smaller than 1:1, the effective length of the male screw shaft 21 can be reduced at the same ratio. Contrarily, when the interlocking ratio is larger than 1:1, the effective length of the male screw shaft 21 must be increased at the same ratio. In the illustrated embodiment, the interlocking ratio is 1:1, the screw shaft 21 of the linear-rotation conversion mechanism 2 pierces through the movable liquid tank 1, and the female screw body 22 is fixed to the bottom portion of the movable liquid tank 1.

The means for rotatably supporting the male screw shaft 21 in the linear-rotation conversion mechanism 2 is not restricted in the present invention in particular. In the illustrated embodiment, both the ends of the male screw shaft 21 are rotatably supported by the bearings 23 and 24 while avoiding movement in the axial direction.

Additionally, in the illustrated embodiment, the linear-rotation conversion mechanism 2 supports the movable liquid tank 1 so as to enable the vertical movement by supporting the male screw shaft 21 as described above. Further, a load acts during generation to as to maintain a descending speed of the movable liquid tank 1 having a predetermined amount of the liquid introduced therein substantially constant.

Although at least one female screw body 22 is used with respect to the male screw shaft 21, a plurality of female screw bodies 22 can be used as desired. For example, the female screw bodies 22 and 22 can be arranged on the upper side and the lower side of the movable liquid tank 1. In this case, when a mass of the movable liquid tank 1, i.e., the load acts on the male screw shaft 21 due to the plurality of female screw bodies 22, an operation of the linear-rotation conversion mechanism 2 may be possibly slightly disordered. As a countermeasure, when the load acts on the one female screw body 22 alone and the remaining female screw body 22 is free from the load, the above-described inconvenience can be avoided. It is to be noted that "being free from the load" means that moving on with the vertical movement of the movable liquid tank 1 but being free from rotation with respect to the male screw shaft.

In the illustrated embodiment, when start of an operation of the linear-rotation conversion mechanism 2 is controlled by the controlling means 4, timing for starting the downward movement of the movable liquid tank 1 can be controlled as desired.

[Liquid Introducing Means 3]

The liquid introducing means 3 is means for introducing a predetermined amount of liquid into the movable liquid tank 1 when the movable liquid tank 1 is placed at the upper position. When the predetermined amount of liquid is introduced into the movable liquid tank 1, a sum total of a mass Q of the introduced liquid and a mass m of a movable mass body M such as the movable liquid tank 1 whose mass can act on the later-described linear-rotation conversion mechanism 2 increases. It is to be noted that, in the illustrated embodiment, the movable mass body M whose mass can act on the linear-rotation conversion mechanism 2 includes, e.g., a float 62 of the later-described movable liquid tank returning means 6, a liquid discharge tube 51, and a magnetic valve 52 besides the movable liquid tank 1 which is a primary constituent element.

Further, when the predetermined amount of the liquid and the movable mass body M move down, since the sum total of the mass Q of the liquid and the mass m of the movable mass body M act on the linear-rotation conversion mechanism 2, a rotation output, i.e., torque obtained from the linear-rotation conversion mechanism 2 increases, and generated electricity can be raised. It is to be noted that the predetermined amount of the liquid may be preset as a design value, or the predetermined amount of liquid may be obtained based on a correlation between an actual generating capacity and an amount of liquid at a time of an operation and then the obtained amount may be set.

In the illustrated embodiment, the liquid introducing means 3 comprises a liquid feed tank 31, liquid introduction tubes 32, a liquid sensor 33, and a magnetic valve 34. These elements will now be described hereinafter.

The liquid feed tank 31 is means for preliminarily storing a liquid from a non-illustrated liquid source. When this liquid feed tank 31 is arranged, since the liquid is smoothly introduced into the movable liquid tank 1, it is possible to avoid rough movement of the liquid that can obstruct the smooth downward movement of the movable liquid tank 1 at a time of introducing the predetermined amount of the liquid into the movable liquid tank 1. As a result, disorder of electricity generation can be suppressed. It is to be noted that reference sign 31a in the drawing denotes an inflow tube of the liquid from the non-illustrated liquid source.

Figure 2:
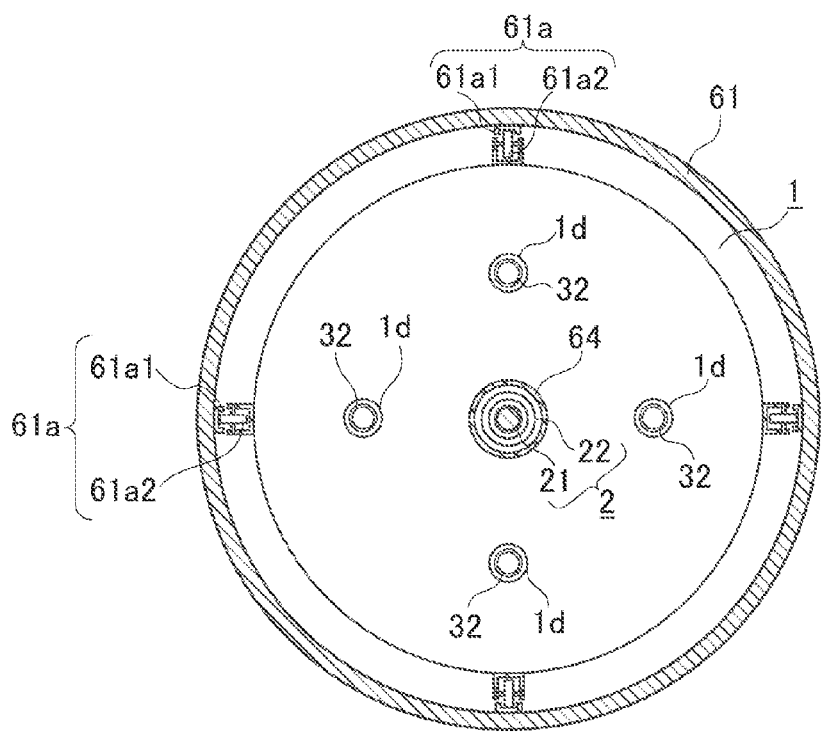
FIG. 2 is a cross-sectional view taken along a line II-II' in FIG. 1.

The liquid introduction tube 32 is means for moving the liquid stored in the liquid feed tank 31 into the movable liquid tank 1. It is to be noted that, when the distal end of the liquid introduction tube 32 is moved closer to the inner bottom portion of the movable liquid tank 1 placed at the upper position, the rough movement of the liquid in the movable liquid tank 1 at a time of introducing the liquid can be further suppressed. Furthermore, as shown in FIG. 2, the four liquid introduction tubes 32 are arranged at intervals of 90° along a virtual circle having, e.g., the linear-rotation conversion mechanism 2 at the center, and the liquid can be dispersed and introduced into the movable liquid tank 1. This point also effectively acts on a reduction in an introduction time while suppressing the rough movement of the liquid at the time of introducing the liquid.

The liquid sensor 33 can contribute to managing a fixed amount of liquid that is introduced into the movable liquid tank 1. In this case, attaching the liquid sensor 33 to the liquid introduction tube 32 is preferable. That is because, since the liquid introduction tube 32 is in a stationary condition even during an operation of the liquid power generation apparatus LG, wiring is easy. Furthermore, when the liquid sensor 33 is arranged on an outer surface of the liquid introduction tube 32, the liquid sensor 33 hardly malfunctions at the time of introducing the liquid, and hence a liquid level control accuracy can be improved. However, the liquid sensor 33 can be also arranged on an inner surface of the liquid introduction tube 32 or a wall surface of the movable liquid tank 1 as desired.

The magnetic valve 34 is means for controlling ON (open) and OFF (close) of a flow of the liquid into the liquid introduction tube 32 from the liquid feed tank 31. That is, the magnetic valve 34 is turned on (opened) at the time of introducing the liquid into the movable liquid tank 1, and it is turned off (closed) upon completion of the introduction of the predetermined amount into the movable liquid tank 1. It is to be noted that, when the magnetic value 34 is turned on and the predetermined amount of the liquid is introduced into the movable liquid tank 1, the magnetic valve 34 is turned off.

[Controlling Means 4]

The controlling means 4 is means for lowering from the upper position the movable liquid tank 1 having the liquid introduced therein. That is, although a position of the movable liquid tank 1 is held by the controlling means 4 until the predetermined amount of the liquid is introduced into the tank at the upper position, when the predetermined amount of the liquid is introduced, the controlling means 4 releases the held state of the movable liquid tank 1 at the upper position. As a result, since the liquid introduced into the movable liquid tank 1 is stored and the sum total of the mass Q of the liquid and the mass m of the movable mass body M increases, the liquid and the movable mass body M start the downward movement by their own weights. At the time of this downward movement, the linear-rotation conversion mechanism 2 operates and converts the linear movement toward the lower side of the movable liquid tank 1 into the rotary movement. At this moment, the linear-rotation conversion mechanism 2 outputs a rotation output, i.e., torque associated with the sum total of the mass Q of the liquid and the mass m of the movable mass body M.

Moreover, as can be understood from the above description, a specific structure of the controlling means is not restricted in particular. A specific structural example is as follows. That is, in the illustrated embodiment, the controlling means 4 includes a magnetic brake 41 that forcibly stops the rotation of the male screw shaft 21 in the linear-rotation conversion mechanism 2. Additionally, to forcibly stop the rotation of the male screw shaft 21, the rotary shaft 25 concentrically extended from the upper end of the male screw shaft 21 is put under control of the magnetic brake 41 so that the rotary shaft 25 cannot rotate. Therefore, since the male screw shaft 21 cannot rotate, the downward movement of the movable liquid tank 1 to which the female screw body 22 is fixed can be stopped.

It is to be noted that, in a situation that the male screw shaft 21 in the linear-rotation conversion mechanism 2 is configured to be fixed to the movable liquid tank 1 and the female screw body 22 is configured to be rotatably supported on the stationary side as a modification, the above-described relationship is unchanged even when the rotation of the female screw body 22 is disabled by the magnetic brake 41 of the controlling means 4. Further, as another modification, the controlling means 4 may be configured to directly place the movable liquid tank 1 under its control, and the movable liquid tank 1 may be held at the upper position until predetermined conditions are met.

[Liquid Discharging Means 5]

The liquid discharging means 5 is means for discharging the liquid in the movable liquid tank 1 to the outside when the movable mass body M including the movable liquid tank 1, whose mass has been increased due to the introduction of the liquid into the tank, is moved down to a predetermined position from the upper position. Based on this discharge, the mass m of the movable mass body M including the movable liquid tank 1 is reduced by an amount corresponding to the mass Q of the discharged liquid.

In the illustrated embodiment, the liquid discharging means 5 includes discharge tubes 51 and magnetic valves 52. The discharge tubes 51 communicate with liquid discharge holes 1e formed in the bottom portion of the movable liquid tank 1, and they are arranged so as to vertically pierce through the later-described float 62 in a liquid-tight manner. The magnetic valves 52 control a flow of the liquid into the discharge tubes 51.

Moreover, the liquid discharging means 5 can be provided with a drainage tank 53 as desired. This drainage tank 53 is means for temporarily storing the liquid before finally discharging the liquid discharged from the movable liquid tank 1

(which will be referred to as a discharged liquid hereinafter) to the outside of the liquid power generation apparatus LG. It is to be noted that reference sign 53a denotes a discharge tube of the liquid. Since the liquid discharging means 5 includes the drainage tank 53, the discharged liquid can be again introduced into the movable liquid tank 1 and readily recycled. That is, using a non-illustrated pump facilitates transfer of the discharged liquid to a desired place. It is to be noted that the desired place can be, e.g., the liquid feed tank 31 of a subsequent liquid power generation apparatus or the liquid power generation apparatus LG mentioned above. In the latter case, when the discharged liquid is used as a part or all of the liquid used for the subsequent generation cycle, a used amount of the liquid supplied from the outside during the generation can be saved in an appropriate manner.

[Movable Liquid Tank Returning Means 6]

The movable liquid tank returning means 6 is means for again moving up the movable liquid tank 1, from which the liquid stored inside has been discharged at the time of the downward movement, and returning it to its original position. In the present invention, since various known means can be used as a specific constitution of the movable liquid tank returning means 6, the movable liquid tank returning means 6 is not restricted in particular. For example, buoyancy force of the liquid can be used or hydraulic means or compressed spring means can be also used so that the movable liquid tank 1 can be returned to the original upper position. Additionally, as a liquid that provides the buoyancy force, the liquid discharged from the movable liquid tank 1 can be reused. The liquid does not have to be newly introduced from the outside in order to again move up the movable liquid tank 1, which is advantageous.

In the illustrated embodiment, when the movable liquid tank 1 floats in the discharged liquid, the buoyancy force of the liquid acting on the movable liquid tank 1 is used for returning the movable liquid tank 1 to its original upper position. This point will now be described in detail. That is, the movable liquid tank returning means 6 comprises an outer tank 61, the float 62, a magnetic valve 63, and liquid blocking means 64.

Figure 3:
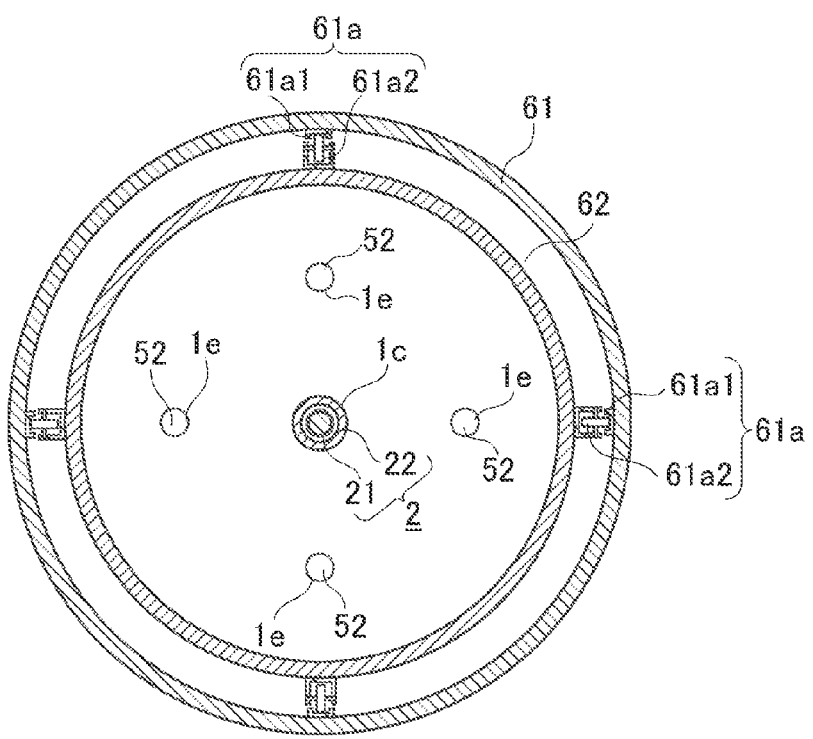
FIG. 3 is a cross-sectional view taken along a line III-III' in FIG. 1.

The outer tank 61 is means that surrounds the movable liquid tank 1 from the outer side thereof so as to allow its vertical movement and can temporarily store the discharged liquid from the movable liquid tank 1. That is, in a state that the movable liquid tank 1 floats in the discharged liquid in the outer tank 61, the movable liquid tank 1 can move up with a rise of a liquid level of the discharged liquid. It is to be noted that, in order to enable smooth movement of the movable liquid tank 1 in the outer tank 61, guiding means 61a can be arranged in a gap formed between both the tanks 1 and 61 as desired. In the embodiment shown in FIG. 1 to FIG. 3, each guiding means 61a comprises a guide rail 61a1 and a roller 61a2. The guide rail 61a1 is arranged along the vertical direction on the inner surface of the outer tank 61. The roller 61a2 is arranged on the outer surface of the movable liquid tank 1 so as to fit to the guide rail 61a1. Further, as shown in FIG. 2 and FIG. 3, each guiding means 61 is arranged to extend along the axial direction in an annular gap, which is narrowed as much as possible, between the outer tank 61 having a circular inner surface as seen in a plan view and the movable liquid tank 1 which has a circular outer surface and is concentrically arranged in the outer tank 61, and the four guiding means 61a are dispersed and arranged around the axis at intervals of 90°.

Furthermore, the outer tank 61 surrounds the movable liquid tank 1 and the float 62 from the outer side within the vertical movement range, and receives the liquid discharged from the movable liquid tank 1. It is to be noted that the movable liquid tank 1, the float 62, and the discharge tube 51 are integrated as primary constituent elements, thereby constituting the movable mass body M. The movable mass body M vertically moves in the outer tank 61, and the outer tank 61 surrounds the outer side of these integrated members. Moreover, the mass of the movable mass body M constitutes a part of a mass that supplies kinetic energy at the time of generation of electricity. When a condition that buoyancy force acting on the float 61 by the discharged liquid exceeds the mass of the movable mass body M is met, the lowered movable liquid tank 1 can be moved up by the discharged liquid.

Additionally, in the illustrated embodiment, an opening end of the outer tank 61 is closed by a lid portion 61b. The configuration that the lid portion 61b can open/close the outer tank 61 is convenient at a time of inspection and repair in the outer tank 61.

The float 62 is means for enabling the movable liquid tank 1 to float in the discharged liquid that is temporarily stored in the outer tank 61. Further, the float 62 contributes to returning the lowered movable liquid tank 1 to its original upper position. Furthermore, when an internal volume of the float 62 is increased like the embodiment shown in FIG. 1 and the buoyancy force of the float 62 is set to be larger than a minimum value required for floating the movable liquid tank 1, mainly the buoyancy force acting on the float 62 increases, and hence electricity can be generated through the linear-rotation conversion mechanism 2 at the time of upward movement of the movable liquid tank 1 using this buoyancy force. As a result, electricity can be continuously generated at the time of the downward movement as well as the upward movement of the movable liquid tank 1. In addition, it is preferable for a generation capacity at the time of upward movement to be equal to a generation capacity at the time of downward movement, but this generation capacity may be equal to or smaller than the latter generation capacity.

Furthermore, it is preferable for the float 62 to be connected to the bottom portion of the movable liquid tank 1 so that the float 62 is integrally connected to the movable liquid tank 1. Based on this connecting conformation, a pushing-up operation for the movable liquid tank 1 is effectively carried out by the float 62. It is to be noted that, since the movable liquid tank 1 is connected to the float 62, both the members move together. However, not only when the float 62 closely adheres to the bottom portion of the movable liquid tank 1 as shown in FIG. 1 but also when both the members are connected even though they are separated from each other as shown in, e.g., FIG. 6 and as will be described later, both the members move together, and hence there is no problem in moving up the movable liquid tank 1.

In this embodiment, the mass m of the movable mass body M is added to the mass Q of the liquid introduced into the movable liquid tank 1, thereby providing a mass that contributes to generation of electricity at the time of downward movement.

Further, in the illustrated embodiment, when the discharged liquid from the movable liquid tank 1 is discharged to the inside of the outer tank 61 through the discharge tube 51 of the liquid discharging means 5, the float 62 gets buoyant on the liquid level of the discharge liquid. Furthermore, when the liquid level of the discharged liquid in the outer tank 61 rises during the discharge process, the movable liquid tank 1 connected to the float 62 interlocks and moves toward the upper position. It is to be noted that, when the magnetic brake 41 of the controlling means 4 is operated and puts the linear-rotation conversion mechanism 2 under its control, the movable liquid tank 1, which has moved to the upper position, can be assuredly held at this position until the predetermined amount of the liquid is subsequently introduced into the inside.

The magnetic valve 63 is arranged so as to perform ON/OFF control with respect to a drainage opening in the bottom portion 65 of the outer tank 61. Therefore, when the magnetic valve 63 is turned on (opened), the discharged liquid in the outer tank 61 moves into the drainage tank 53.

The liquid blocking means 64 is means for surrounding and blocking the linear-rotation conversion mechanism 2 in such a manner that the liquid and/or droplets or steam of the liquid does not adhere to or come into contact with the linear-rotation conversion mechanism 2 when the movable liquid tank 1 vertically moves in the outer tank 61. For example, a bellows and a liquid-tight telescopic mechanism can be used.

In the illustrated embodiment, the liquid blocking means 64 is formed of a pair of bellows which are vertically separately arranged. Moreover, one bellows surrounds the upper side of the male screw shaft 21 of the linear-rotation conversion mechanism 2 between the inner surface of the lid portion 61*b* of the outer tank 61 and the outer surface of the lid portion 1*b* of the movable liquid tank 1, and the other bellows light-tightly surrounds the lower side of the male screw shaft 21 of the linear-rotation conversion mechanism 2 between the outer surface of the bottom portion of the main body portion 1*a* of the movable liquid tank 1 and the inner surface of the bottom portion 61*c* of the outer tank 61.

[Generator 7]

The generator 7 is means that is driven by a desired rotation output, i.e., a torque output from the linear-rotation conversion mechanism 2 and generates electricity. It is to be noted that the term "desired" means that electricity can be generated at the time of the downward movement only or both the downward movement and the upward movement of the movable liquid tank 1.

In the illustrated embodiment, the generator 7 is constituted of a torque transmitting portion 71 and a generator main body 72, and some or all of the respective members are accommodated in a casing 9. It is to be noted that the casing 9 is integrated with the liquid feed tank 31 and the outer tank 61, and it preferably has the same diameter as those of these members. The generator 7 is driven by a rotation output, i.e., a torque output obtained by converting at least the downward movement of the movable liquid tank 1 into rotary movement by the linear-rotation conversion mechanism 2, and then generates electricity. The generator 7 may be arranged so as to be directly connected with the linear-rotation conversion mechanism 2 or may be arranged at a separated position. In this illustrated embodiment, the generator 7 takes the latter conformation, and it is configured to be indirectly driven through the torque transmitting portion 71.

(Torque Transmitting Portion 71)

The torque transmitting portion 71 is means for taking out a rotation output (torque) generated by the linear-rotation conversion mechanism 2 and driving the generator 7 at a necessary number of revolutions. Further, functions of the torque transmitting portion 71 are constituted of a torque take-out portion 711, a rotational direction switching portion 712, and an accelerator 713. Each of the function portions will now be described.

The torque take-out portion 711 is a function element configured to take out torque from the linear-rotation conversion mechanism 2, and its specific structure is not particularly restricted in this embodiment. For example, like the embodiment shown in FIG. 1, this portion is constituted of first and second pulleys 711*a* and 711*b* and a timing belt 711*d*. The first pulley 711*a* is installed on the rotary shaft 25 integrally extended from the upper end of the male screw shaft 21 of the linear-rotation conversion mechanism 2 in the drawing. The second pulley 711*b* is installed on a rotary shaft 711*c* provided away from the rotary shaft 25, and interlocks with the first pulley 711*a* through a timing belt 711*d*. Since a gear 711*e* is installed on the rotary shaft 711*c*, when the male screw shaft 21 rotates, the gear 711*e* rotates. Furthermore, outer teeth of an internal and external gear 711*f* mesh with the gear 711*e*. The internal and external gear 711*f* has internal teeth.

The rotational direction switching portion 712 is functioning means for constantly switching rotation of the generator main body 72 to a predetermined fixed direction in accordance with rotation of the male screw shaft 21 since the rotation of the male screw shaft 21 is reversed depending on the downward movement and the upward movement of the movable liquid tank 1. A specific structure is not particularly restricted in the present invention. Various kinds of known rotational direction switching means can be appropriately selected and used. In the illustrated embodiment, for example, the rotational direction switching portion 712 is constituted of a thrust shaft 712*a*, a pair of drive bevel gears 712*b* and 712*c* facing opposite directions, a thruster 712*d*, a driven shaft 712*e*, and a driven bevel gear 712*f*.

The thrust shaft 712*a* is arranged in parallel to the rotary shaft 711*c*, and a spline groove 712*a*1 is formed on a part of an outer surface thereof in the longitudinal direction. Moreover, internal teeth of the gear 711*f* are spline-connected with the spline groove 712*a*1. It is to be noted that, although not shown in FIG. 1, a position of the gear 711*f* in the vertical direction is regulated so that meshing with the gear 711*f* is not released even though the thrust shaft 712*a* vertically moves by the thruster 712*d*. Additionally, the thrust shaft 712*d* is fixed so as to allow thrusting for a predetermined distance in the axial direction.

The pair of drive bevel gears 712*b* and 712*c* facing the opposite directions are fixed to and installed on the thrust shaft 712*a* in a state that tooth portions which are inclined at 45° face each other at an interval. Further, the pair of drive bevel gears 712*b* and 712*c* are separated from each other at an interval of a distance that enables the later-described drive bevel gear 712*f* to selectively mesh with one of the drive bevel gears 712*b* and 712*c* alone at the time of thrusting of the thrust shaft 712*d*.

The driven shaft 712*e* is arranged so as to be orthogonal to the thrust shaft 712*a* and rotatably fixed. It is to be noted that an input shaft of the later-described accelerator 713 can also function as the driven shaft 712*e*.

The driven bevel gear 712*f* is fixed and installed on the driven shaft 712*e* and meshes with one of the pair of drive bevel gears 712*b* and 712*c*, and torque of the male screw shaft 21 is transmitted via the torque takeout portion 711 and the rotational direction switching portion 712, and the driven shaft (the input shaft) 712*e* is rotated.

The thruster 712*d* is means for sliding the thrust shaft 712*a* in the axial direction and meshing a necessary one of the pair of drive bevel gears 712*b* and 712*c* with the driven bevel gear 712*f*. Further, for example, remote controlling means such as electric or hydraulic means can be used to enable remote control and interlocking control.

The accelerator 73 is means that is interposed between the rotational direction switching portion 712 and the generator main body 72, accelerates the number of revolutions obtained from the rotational direction switching portion 712 to the number of revolutions that enhances the efficiency of the generator main body 72, outputs this number of revolutions from the output shaft 713, and drives the generator main body 72. An accelerator using a known planetary gear can be adopted.

(Generator Main Body 72)

A type of the generator main body 72 is not restricted in particular. For example, a synchronous generator, an induction generator, a direct-current generator, or the like can be appropriately selected and used.

[Casing 9]

The casing 9 is interposed between the liquid feed tank 31 and the outer tank 61, and it is configured by surrounding a part between the bottom surface of the liquid feed tank 31 and the lid portion 61b of the outer tank 61 using an annular surrounding wall. Furthermore, in the illustrated embodiment, the first pulley 711a and the timing belt 711d of the generator 7 are accommodated inside. However, the entire generator 7 including the torque transmitting portion 71 and the generator main body 72 can be accommodated in the casing 9 as desired.

[Shell Structure of Liquid Power Generation Apparatus LG]

In this embodiment, a movable portion in the liquid power generation apparatus LG is closed with respect to the periphery by a shell S. That is, the shell S is integrally constituted of the outer tank 61, the liquid feed tank 31, and the drainage tank 53, and it integrates the entire apparatus so as to include the movable liquid tank 1 and the linear-rotation conversion mechanism 2 that constitute the movable portion in the liquid power generation apparatus LG.

[Operation of Liquid Power Generation Apparatus LG in First Embodiment]

In regard to an operation of the liquid power generation apparatus according to the first embodiment, an example of using water as a liquid and generating electricity will now be described in the process order.

1. Preparation of Introduction Water

Before activating the liquid power generation apparatus LD, the movable liquid tank 1 is held at the upper position in advance and water is stored in the liquid feed tank 31 in advance. It is to be noted that, when the movable liquid tank 1 is placed at the upper position, the movable liquid tank 1 is mechanically connected to the linear-rotation conversion mechanism 2 at one end of its effective length on the upper side. When the liquid that is introduced into the movable liquid tank 1 is prepared near the movable liquid tank 1 in advance, the liquid can be introduced into the movable liquid tank 1 in an extremely short time. Further, the liquid can be effectively prevented from roughly moving in the movable liquid tank 1 at a time of introducing the liquid in a short time. Additionally, the introduction liquid can be allowed to continuously flow into the liquid feed tank 31 even during each process, i.e., introduction of the liquid into the movable liquid tank 1, generation of electricity, and discharge of the liquid. Therefore, there is no problem even if a feed rate per unit time of the introduction water with respect to the liquid feed tank 31 is small.

2. Introduction of Water into Movable Liquid Tank 1

The magnetic valve 34 of the liquid introducing means 3 is turned on (opened), and the liquid power generation apparatus LG is started. As a result, the water in the liquid feed tank 31 is introduced into the movable liquid tank 1 through the magnetic valve 34 and the liquid introduction tube 32. It is to be noted that, as compared with a generation time at a time of the downward movement, an introduction time can be extremely short. Moreover, a head does not have to be given to the liquid at the time of introducing the liquid into the movable liquid tank 1. Therefore, a degree of freedom is increased with respect to available conformations of the liquid, and suitable places where the liquid power generation apparatus LG according to the present invention can be installed are not limited.

3. Start of Downward Moving of Movable Liquid Tank 1

When a predetermined amount of water is introduced into the movable liquid tank 1, the magnetic brake of the controlling means 4 releases a holding operation of the movable liquid tank 1. When this operation is released, since a load of the generator 7 acts on the movable mass body M constituted of the movable liquid tank 1 having the water introduced therein, the liquid introduction tube 32, and the float 62, the downward movement begins at a substantially constant speed by a function of the linear-rotation conversion mechanism 2.

4. Torque Output of Linear-Rotation Conversion Mechanism 2 in Downward Moving

When the downward moving at the substantially constant speed of a sum total of the mass Q of the water introduced into the movable liquid tank 1 and the mass m of the movable mass body M starts, the male screw shaft 21 at the linear-rotation conversion mechanism 2 rotates through the female screw body 22, and large torque is generated.

5. Generating Operation in Downward Moving

When the male screw shaft 21 of the linear-rotation conversion mechanism 2 rotates, the torque is transmitted to the rotary shaft 25, the first pulley 711a, the timing belt 711d, the second pulley 711b, the rotary shaft 711c, the gear 711e, the internal and external gear 711f, the thrust shaft 712a, the bevel gear 712b, the driven bevel gear 712f, and the accelerator 713 of the torque transmitting portion 71 in the generator 7 in the mentioned order, the torque is converted into a revolving speed suitable for the generator main body 72, the generator main body 72 is driven, and electricity is generated.

Start of Upward Moving of Movable Liquid Tank 1

When the movable liquid tank 1 reaches a predetermined lower position, the liquid discharging means 5 is actuated, the magnetic valve 52 is turned on (opened), and the water in the movable liquid tank 1 is discharged and moved into the outer tank 61 via the magnetic valve 52 and the discharge tube 51. Therefore, a water surface in the outer tank 61 starts to rise. With this rise, the float 62 floats on the water surface of the discharged liquid in the outer tank 61, and hence the movable liquid tank 1 starts upward moving. It is to be noted that, when the movable liquid tank 1 reaches the predetermined lower position, the movable liquid tank 1 is connected to the linear-rotation conversion mechanism 2 at the other end of its effective length on the lower side. Namely, it is desirable to utilize the substantially entire region of the effective length of the linear-rotation conversion mechanism 2 and move up and down the movable liquid tank 1. However, the movable liquid tank 1 may be configured to move up and down without using a part of the region of the effective length of the linear-rotation conversion mechanism 2 as desired.

7. Torque Output of Linear-Rotation Conversion Mechanism 2 in Upward Moving

Since buoyancy force acting on the float 62 connected with the movable liquid tank 1 is large, even at a time of the upward movement of the movable liquid tank 1, remaining buoyancy force obtained by subtracting the mass of the movable mass body M from the buoyancy force urges the male screw shaft 21 to rotate with large force through the female screw body 22 in the linear-rotation conversion mechanism 2. As a result, the male screw shaft 21 rotates in a direction opposite to that in downward moving by the remaining buoyancy force and generates a large torque output.

8. Generating Operation in Upward Moving

When the movable liquid tank 1 rises, since the male screw shaft 21 in the linear-rotation conversion mechanism 2 rotates in the direction opposite that in downward moving, the thruster 712d of the rotational direction switching portion 712 operates and pulls the thrust shaft upward in FIG. 1. As a result, the torque is transmitted to the rotary shaft 25, the first pulley 711a, the timing best 711d, the second pulley 711b, the rotary shaft 711c, the gear 711e, the internal and external gear 711f, the thrust shaft 712a, the bevel gear 712c, the driven bevel gear 712f, and the accelerator 713 in the mentioned order, and the torque is converted into a rotational direction and a speed suitable for the generator main body 72.

9. Drainage Operation

When the movable liquid tank 1 reaches the predetermined original upper position, since the magnetic brake 41 of the controlling means 4 again puts the rotary shaft 25 under control so as not to rotate, the movable liquid tank 1 is stopped at this position, and generation of electricity in the rising is completed. Since the magnetic valve 63 of the liquid tank returning means 6 is turned on (opened) in synchronization with this completion, the water stored in the outer tank 61 moves into the drainage tank 53 in a short time through the magnetic valve 63. As a result, this used water can be discharged to the outside, or a part or all of the water can be returned to the liquid feed tank 31 for recycle as desired.

10. Repetitive Operation of Above Processes

When the movable liquid tank 1 reaches the upper position, the processes 1. to 9. are repeatedly carried out, and electricity is intermittently generated at intervals that occur for a short time in order to introduce the water into the movable liquid tank 1.

In this embodiment, the effects of the present invention are exercised as described above, and the following effects are also exerted.

(1) In case of repeating a series of operations, i.e., converting the linear movement when the predetermined mass falls from the predetermined position into the torque by the linear-rotation conversion mechanism 2, generating electricity, raising the mass, and generating electricity when the mass again falls, introducing the liquid into the movable liquid tank 1 enables securing a predetermined relatively large mass at the time of falling, the liquid is discharged from the movable liquid tank 1 after the falling, the mass at the time of the rising of the movable liquid tank 1 is thereby relatively reduced, the movable liquid tank 1 can be moved to the upper position by utilizing the discharged liquid from the movable liquid tank 1, and hence a small amount of the liquid used for generation of electricity can suffice, thus enhancing the generating efficiency per adopted liquid.

(2) At a time of taking out a torque output by using the linear-rotation conversion mechanism 2, even if a distance of the downward movement of the movable liquid tank 1 is set to a short distance, e.g., 1 m or below as desired, sufficient electricity can be generated, and the torque can be highly efficiently taken out. Therefore, the liquid power generation apparatus LG according to this embodiment can be manufactured while suppressing its entire length, the liquid power generation apparatus LG can be thereby downsized, handling such as conveyance or installation of this apparatus can be facilitated, limitations on suitable places for the liquid power generation apparatus LG can be greatly reduced, and the high generation efficiency can be obtained.

(3) Since a head does not have to be provided to the liquid at the time of introducing the liquid into the movable liquid tank 1, various conformations of the liquid can be utilized, and limitations on suitable places for the liquid power generation apparatus LG can be greatly reduced.

(4) Since the movable portion including the movable liquid tank 1 and the linear-rotation conversion mechanism 2 is surrounded and protected by the outer tank 61, safety is assured, a noise level at a time of generating electricity is lowered, foreign matters can be prevented from entering the inside of the apparatus, and the reliability of the operation of the liquid power generation apparatus LG can be improved.

(5) Since the movable portion, i.e., the movable liquid tank 1, the linear-rotation conversion mechanism 2, and the generator 7 can be configured to be closed by the shell S constituted of the outer tank 61 and others and the entire liquid power generation apparatus LG can be integrated, handling of the liquid power generation apparatus LG can be facilitated, conveyance and installation can be made easy, and durability of the liquid power generation apparatus LG can be improved.

(6) When an absolute value of the buoyancy force acting on the float 62 of the liquid tank returning means 6 at the time of the upward movement of the movable liquid tank 1 is set to be equal to the sum total of the mass Q of the liquid introduced into the movable liquid tank 1 and the mass m of the movable mass body M, generation of electricity, which is substantially equivalent to generation of electricity at the time of downward movement, can be carried out at the time of the upward movement of the movable liquid tank 1. Thus, electricity is not generated in one cycle of the downward movement and the upward movement of the movable liquid tank 1 only when the liquid is introduced into the movable liquid tank 1. Therefore, a generating capacity can be increased as compared with that in case of generating electricity only when the movable liquid tank 1 moves downward.

(7) Since the upper surface of the float 62 of the movable liquid tank returning means 6 is adjoined against the bottom surface of the movable liquid tank 1, a height of the movable liquid body M can be reduced. Therefore, a necessary height of the outer tank 61 can be reduced. As a result, the entire length of the liquid power generation apparatus can be reduced.

[Second Embodiment of Liquid Power Generation Apparatus]

A second embodiment of a liquid power generation apparatus LG according to the present invention will now be described with reference to FIG. 5. It is to be noted that like reference numerals denote parts equal to those in FIG. 1 to FIG. 4, and a description thereof will be omitted.

This embodiment is configured to generate electricity only when a movable liquid tank 1 moves downward. That is, in comparison with the first embodiment, this embodiment is different in that a volumetric capacity of a float 62 of movable liquid tank returning means 6 is small and buoyancy power that is required for again moving a movable mass body M including the empty movable liquid tank 1 to an upper position can be obtained after the movable liquid tank 1 moves down and a liquid is discharged.

Furthermore, in case of avoiding generation of electricity at the time of upward movement of the movable liquid tank 1 and raising the movable liquid tank 1 by utilizing the buoyancy force acting on the float 62, providing clutch means interposed between the movable liquid tank 1 and the generator 7 is preferable. Then, when the clutch means is operated at the time of upward movement of the movable liquid tank 1 and a linear-rotation conversion mechanism 2 is set to be free with respect to rotation, a load acting on the movable liquid tank 1 via the linear-rotation conversion mechanism 2 can be prevented from canceling out the buoyancy force of the float

62. As a result, even if the buoyancy force of the float 62 is relatively small, a time required for returning the movable liquid tank 1 to the upper position can be shortened, each interval where electricity is not generated can be decreased, and a ratio of a generation time can be thereby relatively increased. It is to be noted that a magnetic brake of controlling means 4 has a clutch function in the illustrated embodiment.

According to the second embodiment, since the float 62 of the movable liquid tank returning means 6 can be reduced in size, the entire length of the liquid power generation apparatus LG can be thereby decreased, and hence the liquid power generation apparatus LG can be further downsized and provided at a low price. Further, in case of fixing the size of each of the movable liquid tank 1 and the float 62, small buoyancy force of the float 62 can suffice, and hence a volumetric capacity of the movable liquid tank 1 can be thus relatively increased. It is to be noted that, in place or in addition to providing the clutch means, an output end of a generator main body 72 can be opened, and a no-load state may be provided. In this case, the linear-rotation conversion mechanism 2 can be free with respect to rotation.

[Third Embodiment of Liquid Power Generation Apparatus]

Figure 6:
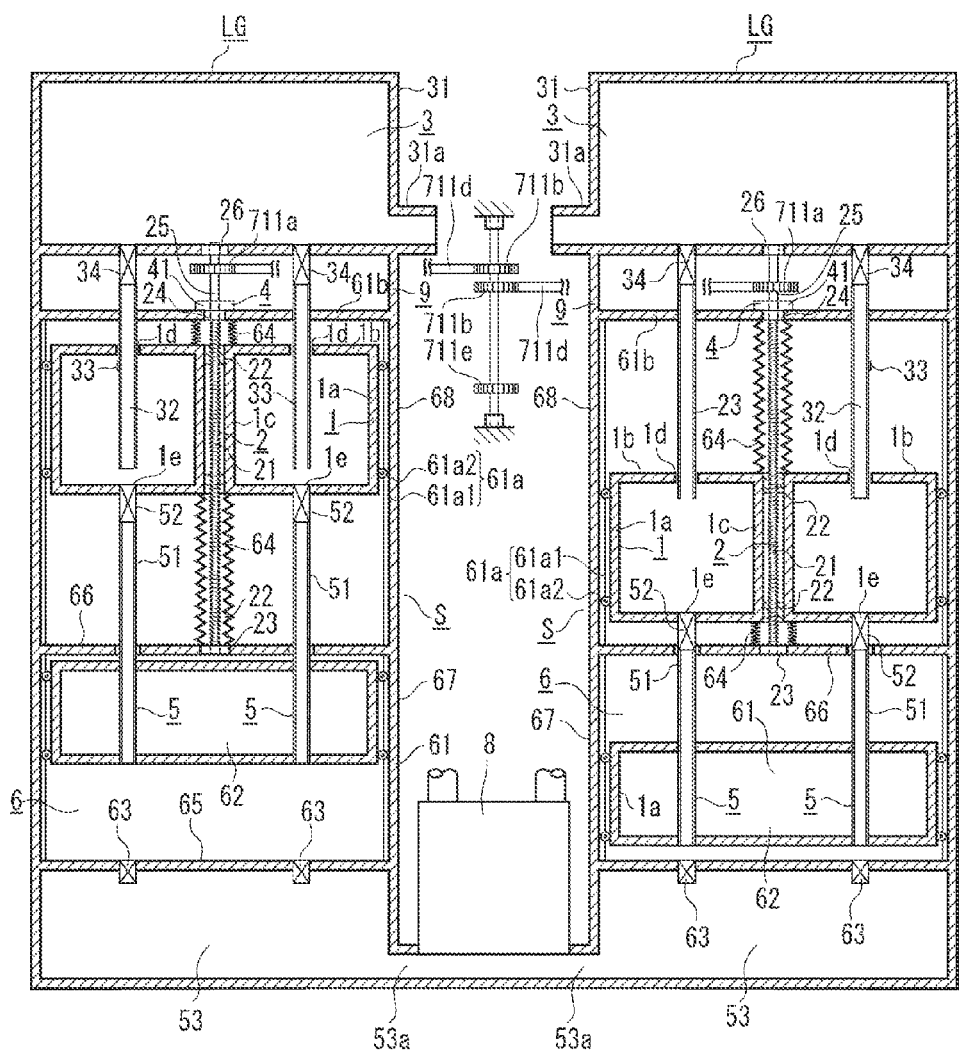
FIG. 6 is a front longitudinal cross-sectional view according to a third embodiment of a liquid power generation apparatus of the present invention and a second embodiment of a liquid power generation system of the present invention.

A third embodiment of a liquid power generation apparatus LG according to the present invention will now be described with reference to FIG. 6. It is to be noted that like reference numerals denote parts equal to those in FIG. 1 to FIG. 4, and a description thereof will be omitted. In the drawing, in this embodiment, a pair of liquid power generation apparatuses LG are arranged on left and right sides of the drawing. However, a mutual relationship between the pair of liquid power generation apparatuses LG will be described later since the second embodiment of a later-described liquid power generation system will be configured. This embodiment relates to a configuration of the single liquid crystal power generation apparatus LG.

In this embodiment, a float 62 is arranged at a position that is separated downward from a bottom portion of a movable liquid tank 1. Therefore, a discharge tube 51 can be elongated in the vertical direction. It is to be noted that the float 62 and the movable liquid tank 1 can be integrally coupled through the discharge tube 51. Therefore, the discharge tube 51 protruding downward from the bottom portion of the movable liquid tank 1 is formed to be longer than the counterpart in FIG. 1, and the float 62 and the movable liquid tank 1 are integrally supported at a distal end portion of each discharge tube 51 while separating the float 62 and the movable liquid tank 1 from each other. However, a point that the movable liquid tank 1, the float 62, magnetic valves 34, and the discharge tubes 51 form a movable mass body M is the same as the foregoing embodiments.

An outer tank 61 is longer than the counterpart in each of the foregoing embodiments in accordance with separation of the movable liquid tank 1 and the float 62. Further, a float surrounding portion 67 facing an operating region of the float 62 in the outer tank 61 is separated from a movable liquid tank surrounding portion 68 facing an operating region of the movable liquid tank 1 in the same by using a partition wall 66. It is to be noted that each discharge tube 51 pierces through the partition wall 66 so as to allow its forward and backward movement. Furthermore, a lower end of a male screw shaft 21 of a linear-rotation conversion mechanism 2 is supported rotatably to a bearing 23 arranged on the partition wall 66.

According to this embodiment, since the float 62 is separated toward the lower side from the movable liquid tank 1, each discharge tube 51 extending so as to pierce through the float 1*a* can be elongated toward the lower side, and hence a head at the time of discharging a liquid in the movable liquid tank 1 into the outer tank 61 relatively increases. As a result, if each discharge tube 51 has an inner diameter, since a liquid discharging rate is raised due to the head, and hence the discharge of the liquid from the movable liquid tank 1 that is carried out after reaching a predetermined lower position is finished in a relatively short time. Therefore, each pause time of electricity generation in a generation cycle can be properly reduced.

Moreover, since the float 62 is downwardly separated from the movable liquid tank 1, the linear-rotation conversion mechanism 2 which cooperates with the movable liquid tank 1 is separated from the discharged liquid in the outer tank 61, and hence reliability for operation stability and durability of the linear-rotation conversion mechanism 2 can be assured even though liquid blocking means 64 is not arranged around the linear-rotation conversion mechanism 2.

Additionally, when the partition wall 66 is arranged between the movable liquid tank 1 and the float 62, the linear-rotation conversion mechanism 2 further hardly comes into contact with the liquid, and hence the reliability for the operation stability and the durability of the linear-rotation conversion mechanism 2 can be further improved. However, as shown in the drawing, the liquid blocking means 64 is allowed to be arranged as desired. If this means is arranged, the reliability for the operation stability and the durability of the linear-rotation conversion mechanism 2 can be further improved.

[Fourth Embodiment of Liquid Power Generation Apparatus]

A configuration of a fourth embodiment of a liquid power generation apparatus LG according to the present invention will now be described with reference to FIG. 7 to FIG. 10. It is to be noted that like reference numerals denote parts equal to those in FIG. 6, and a description thereof will be omitted. This embodiment solves the problems of the present invention described above and facilitates introducing a liquid into a movable liquid tank 1 to secure a desired mass, generating electricity, and then returning the movable liquid tank 1 to its original upper position using the liquid discharged to the inside of an outer tank 61 like the third embodiment, but it is different from the third embodiment in that the movable liquid tank 1 can be easily moved to a desired position even though an amount of the liquid to be discharged is relatively small.

Meanwhile, in the previous third embodiment, an inside diameter of the outer tank 61 is fixed as a whole including the movable liquid tank surrounding portion 68 to the float surrounding portion 67. An outside diameter of the movable liquid tank 1 is set to be smaller than the inside diameter of the outer tank 61 because the movable liquid tank 1 moves up and down in the outer tank 61. Therefore, a gap is formed between the movable liquid tank 1 and the inner surface of the outer tank 61, and the movable liquid tank 1 hardly graze over the outer tank 61 during an operation.

However, a height of a liquid level of the liquid discharged from the movable liquid tank 1 in the float surrounding portion 67 of the outer tank 61 is lower than a height of the liquid when it is introduced in the movable liquid tank 1. Therefore, in case of moving the movable liquid tank 1, which has fallen to a predetermined position in the outer tank 61, to the upper position by floating the movable liquid tank 1 on the liquid discharged therefrom, returning the movable liquid tank 1 to its original upper position at the time of starting tends to become difficult even if all of the liquid in the movable liquid tank 1 is discharged. Thus, when an internal volume of the movable liquid tank 1 is increased and an amount of the liquid to be introduced is increased or when an additional liquid is added from, e.g., the liquid feed tank 31 at the time of discharging the liquid from the movable liquid tank 1 so that the liquid level height when the liquid is discharged into the outer tank 61 can have a value that is sufficient to return the movable liquid tank 1 to its original upper position, the above-described problems can be solved, but a used amount of the liquid that is utilized for generation of electricity is increased, and a configuration and control of the liquid power generation apparatus LG are complicated.

On the other hand, in this embodiment, an area in a float surrounding portion 67 of an outer tank 61 in a planar view is set to be equal to or smaller than an area in a movable liquid tank 1 in a planar view. For example, if both the float surrounding portion 67 of the outer tank 61 and the movable liquid tank 1 have a circular shape in a planar view, an inside diameter of the float surrounding portion 67 of the outer tank 61 is set to be equal to or smaller than an outside diameter of the movable liquid tank 1. That is, the area of the float surrounding portion 67 of the outer tank 61 in the planar view is reduced to be equal to or smaller than the area, i.e., the inside diameter of the movable liquid tank 1 in the planar view. It is to be noted that the area in a planar view means an area when the liquid power generation apparatus LG is seen from the upper side, namely, a corresponding part is seen from the upper side in FIG. 7.

Further, an area of an outer shape of a float 5 in a planar view is set to be smaller than an area of the float surrounding portion 67 of the outer tank 61 in a planar view, whereby the float 62 can move in the float surrounding portion 67 of the outer tank 61 without problems. It is to be noted that, in this embodiment, the float 5 moves up and down in the float surrounding portion 67 of the outer tank 61, and the movable liquid tank 1 moves up and down in the movable liquid tank surrounding portion 68 of the outer tank 61. Of course, since the movable liquid tank 1 and the float 5 are united through, e.g., each discharge tube 5, these members simultaneously move up and down in tandem with each other.

Since the liquid power generation apparatus LG has the above-described structure, the liquid level height of the liquid discharged into the float surrounding portion 67 of the outer tank 61 is equal to or higher than the liquid level height in the movable liquid tank 1. Therefore, the movable liquid tank 1 that has come down from the upper position can be floated on the discharged liquid, and it can be readily returned to the original position. It is to be noted that, when the area of the float surrounding portion 67 of the outer tank 61 in a planar view is smaller than the area of the movable liquid tank 1 in a planar view, the movable liquid tank 1 can be moved to a position which is above the original upper position by discharging the liquid into the float surrounding portion 67, adopting a configuration that prevents the upward movement beyond the original position is easy, and hence the movable liquid tank 1 can be stopped at its original position. However, when the area of the float surrounding portion 67 of the outer tank 1 in a planar view is too small, since a height size of the float 62 must be increased to assure a required value as the buoyancy force of the float 62, a properly increased height of the float surrounding portion 67 must be set, the outer tank 1 is thereby elongated, and the entire length of the liquid power generation apparatus LG is increased, which is not preferable. The area of the float surrounding portion 67 in a planar view is more or less 70% of the area of the movable liquid tank 1 in a planar view. More preferably, it is up to 90%.

In this embodiment, a description will now be given as to the following conditions for obtaining the relatively compact liquid power generation apparatus LG which reduces an amount of the liquid used for electricity generation based on a relationship between a mass Q (kg) of the liquid (mainly in case of water) introduced into the movable liquid tank 1, a weight m (kg) of the movable mass body M itself, and an absolute value B of buoyancy force −B (kg) with respect to the liquid in the float 62, moves the movable liquid tank 1 to the upper position by using the liquid discharged from the movable liquid tank 1, and repeatedly generates electricity.

$$0.4Q \leq m \leq Q \quad \text{(Expression 1)}$$

$$1.03m \leq B \leq 1.6m \quad \text{(Expression 2)}$$

Expression 1 is provided by obtaining a preferred relationship between the mass m of the movable mass body M and the mass Q of the liquid introduced into the movable liquid tank 1 based on an experiment. If this range is met, it is easy to again move up the comedown movable mass body M by using the discharged liquid simultaneously with reducing the amount of the liquid used for electricity generation, whereby the liquid power generation apparatus LG can be downsized. Further, when the mass m of the movable mass body M is less than 0.4 Q, the mass Q of the liquid introduced into the movable liquid tank 1 must be properly increased in order to obtain the same electricity generating capacity, and the used amount of the liquid cannot be reduced, which is not effective. Furthermore, when the mass m of the movable mass body M exceeds Q, a volumetric capacity of the float 62 required for again moving up the movable mass body M must be properly increased, and the liquid power generation apparatus LG cannot be downsized, which is not effective. It is to be noted that the more preferred range is $0.5Q \leq m \leq 0.85Q$. If this range is met, it is very easy to again move up the fallen movable mass body M by using the discharged liquid simultaneously with considerably reducing the amount of the liquid used for electricity generation, whereby the liquid power generation apparatus LG can be greatly downsize.

Expression 2 is provided by obtaining a preferred relationship between the absolute value B of the buoyancy force −B(kg) that should be given to the float 62 to move up the movable liquid tank 1 from the lower position and the mass m (kg) of the movable mass body M in a conformation that electricity is generated only when the movable liquid tank 1 is moved down. If this range is met, the movable mass body M after discharging the liquid from the movable liquid tank 1 can be moved to the upper position in a practical short time. However, if the absolute value B of the buoyancy force −B of the float 62 is less than 1.03-fold of the mass of the movable mass body M, the upward movement in the practical short time is difficult, which is not effective. Moreover, if the absolute value B of the buoyancy force −B of the float 62 exceeds 1.6-fold of the mass of the movable mass body M, the upward movement in a very short time is possible, but the float 62 is too large, which is not effective. To suppress the size of the float 62 and move up the movable mass body M in a sufficiently short time, the buoyancy force B meeting $1.15m < B < 1.45$ can suffice.

In the illustrated embodiment, structures other than that described above are as shown in FIG. 7 to FIG. 10.

It is desirable to narrow a gap between the movable liquid tank 1 and the movable liquid tank surrounding portion 68 of the outer tank 61 and a gap between the float 62 and the float surrounding portion 67 of the outer tank 61. However, although not shown, the same guiding means 61a as that shown in FIG. 1 is arranged in each of these gaps and facilitates the smooth upward and downward movements of the movable liquid tank 1 and the float 62.

In the linear-rotation conversion mechanism 2, the male screw shaft 21 has an upper end rotatably supported by a bearing 24 and detachably connected to a rotary shaft 25 via controlling means 4 in the drawing. The controlling means 4 is constituted of, e.g., a magnetic brake having a clutch function. Additionally, a rotary shaft 27 is integrally connected to a lower end of the male screw shaft 21. Further, a lower end of the rotary shaft 27 is rotatably supported by a bearing 23. Since the male screw shaft 21 is arranged in the movable liquid tank surrounding portion 68 into which the liquid from the float surrounding portion 67 of the outer tank 61 does not flow, the male screw shaft 21 can be arranged in an environment where inflow of the liquid does not occur, and the reliability for the operation stability and the durability of the male screw shaft 21 can be improved. It is to be noted that arranging a liquid seal (not shown) between the lower end of the male screw shaft 21 and the partition wall 66 as desired enables actively preventing inflow of the liquid from the float surrounding portion 67.

Further, the linear-rotation conversion mechanism 2 comprises a pair of female screw bodies 22A and 22B. Although the pair of female screw bodies 22A and 22B are separately arranged at the upper end and the lower end of the movable liquid tank 1, one of them, e.g., the female screw body 22A provided at the upper position is configured to be freely rotatable with respect to the movable liquid tank 1 but to be suppressed in the axial direction. As a result, even if the pair of female screw bodies 22A and 22B do not constantly accurately operate in synchronization with each other, the linear-rotation conversion mechanism 2 can smoothly operate, and high durability of the linear-rotation conversion mechanism 2 can be maintained. For example, the other lower female screw body 22B is prevented from rotating with respect to the movable liquid tank 1 and fixed, and the downward movement of the movable liquid tank 1 is transmitted to the male screw body 21 and converted into rotary movement.

Figure 10:
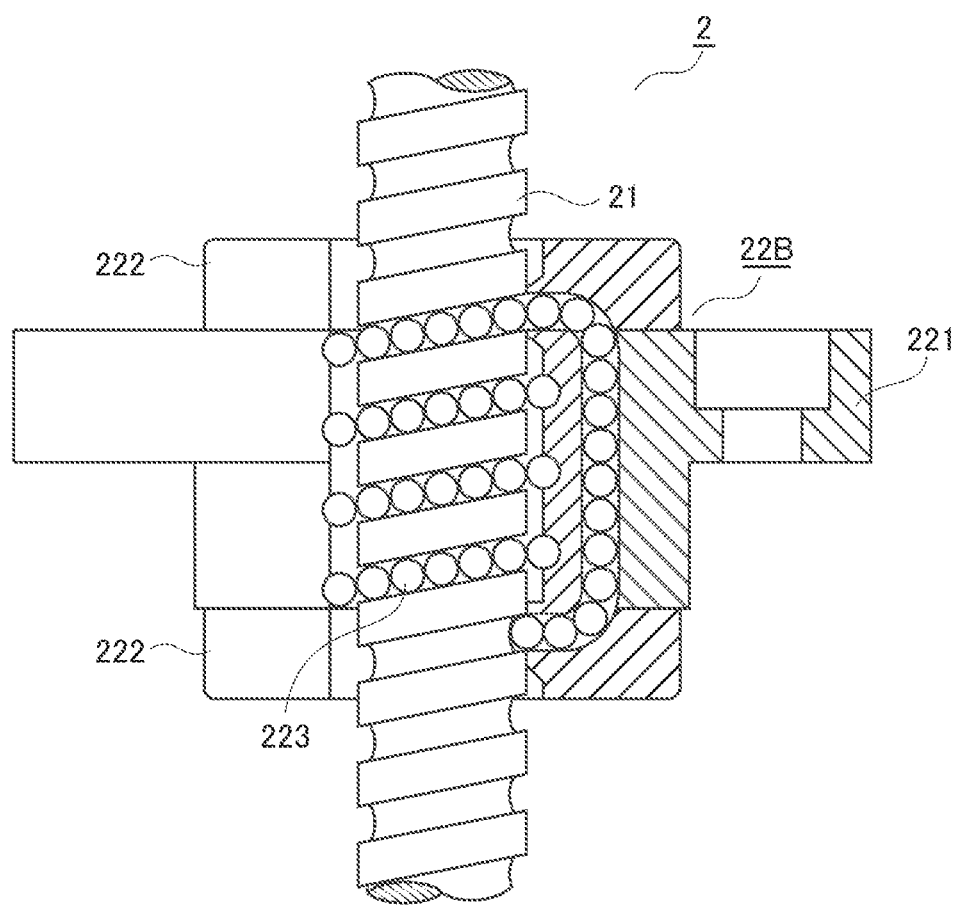
FIG. 10 is an enlarged partially sectional front elevation of a linear-rotation conversion mechanism according to the fourth embodiment of a liquid power generation apparatus.

Further, in this embodiment, the linear-rotation conversion mechanism 2 is constituted of a ball screw, and its female screw body 22B has such a structure as shown in FIG. 10, for example. That is, the female screw body 22B adopts an end cap system that a pair of end caps 222 and 222 are arranged on both surfaces of a nut main body 221 and hence a ball bearing 223 is circulated inside.

In the partition wall 66 that partitions the float surrounding portion 67 and the movable liquid tank surrounding portion 68 of the outer tank 61, a liquid seal 66a is arranged at a region where the liquid discharge tube 51 runs. This liquid seal 66a allows the movement of the discharge tube 51 in the up-down direction but avoids inflow of the liquid. This configuration can aggressively avoid inflow of the liquid from the float surrounding portion 67.

The rotary shaft 27 is rotatably loosely inserted into a through portion 62a formed at a gravity point portion of the float 62. In the illustrated embodiment, the lower end of the discharge tube 51 is opened, but checking means such as a magnetic valve or a check valve can be arranged as desired and the liquid can be prevented from entering the discharge tube 51 at the time of the upward movement of the movable liquid tank 1 so that buoyancy force cannot be canceled out.

Figure 7:
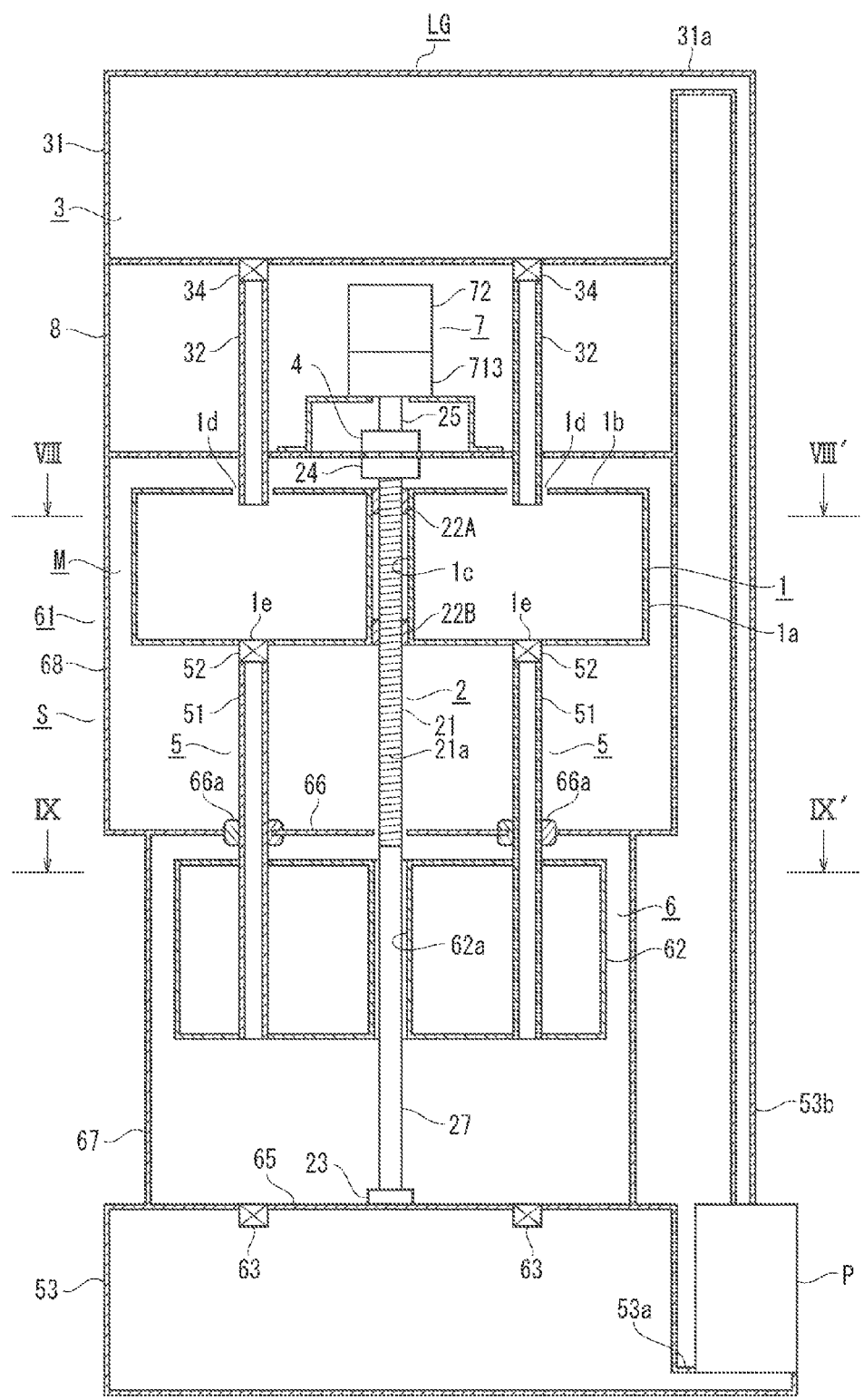
FIG. 7 is a front longitudinal cross-sectional view according to a fourth embodiment of a liquid power generation apparatus of the present invention.
Figure 8:
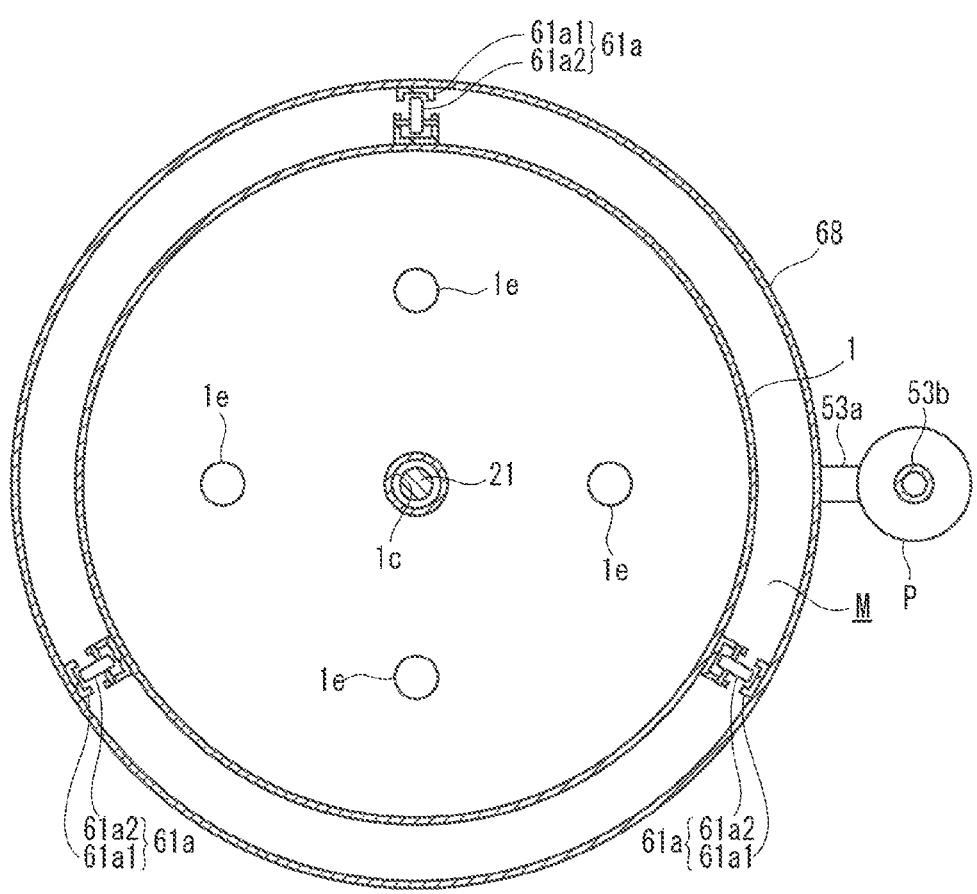
FIG. 8 is a cross-sectional view taken along a line VIII-VIII' in FIG. 7.
Figure 9:
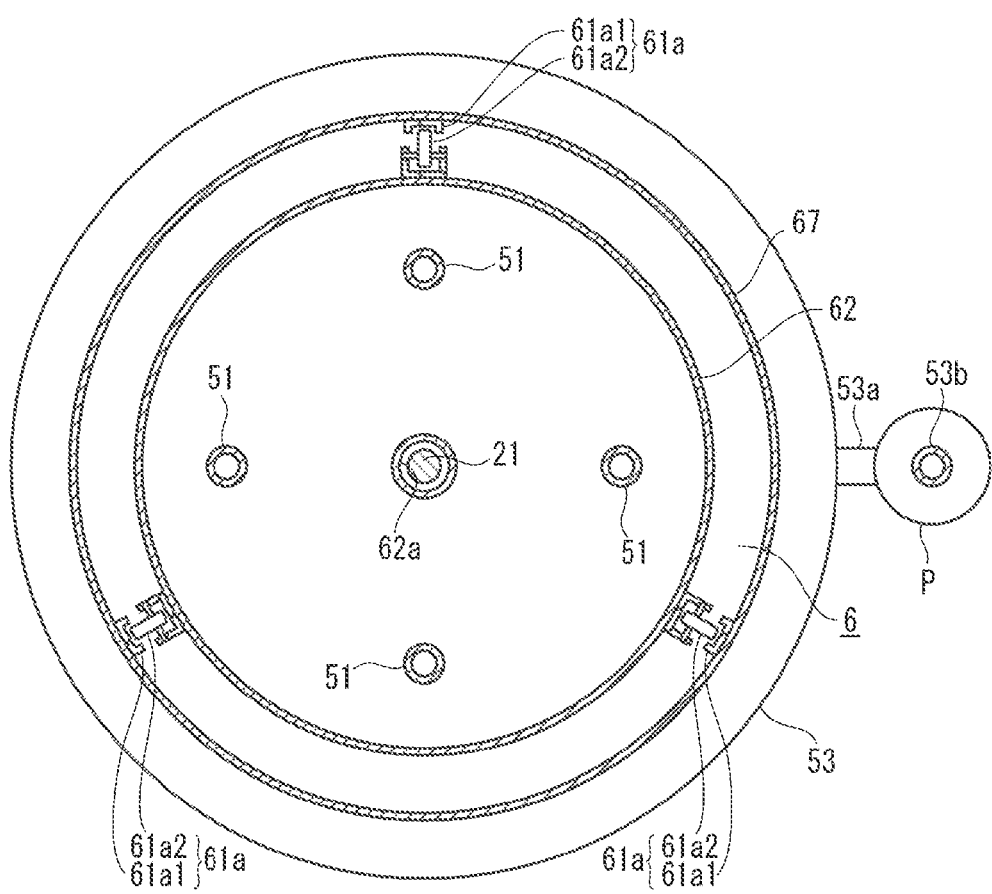
FIG. 9 is a cross-sectional view taken along a line IX-IX' in FIG. 7.

A drainage tank 53 includes a communicating portion 53a so that the liquid after generation of electricity can be discharged to the non-illustrated outside via a circulation pump P or it can be circulated to the liquid feed tank 31 via the circulation pump P and a circulation line 53b as shown in FIG. 7 to recycle the discharged liquid. It is to be noted that a part of the liquid can be discharged to the outside and a remaining part can be circulated.

An entire generator 7 is accommodated in a casing 9. That is, an input end of an accelerator 713 is connected to the rotary shaft 25, and a generator main body 72 driven by an output end of the accelerator 713 is directly connected to the accelerator 713.

A specification example based on calculation of a primary specification of the liquid power generation apparatus LG in the fourth embodiment shown in FIG. 7 to FIG. 10 will now be explained. It is to be noted that the liquid to be used is water.

[Specification Example 1 of Liquid Power Generation Apparatus Lg]

A cylindrical shape, a maximum diameter: 1.5 m, a height: 4.2 m,

The liquid feed tank 31, a discoid shape, a diameter: 1.5 m, a height: 0.35 m

A generator mechanism portion, a mass: 1000 kg, a diameter: 1.5 m, a height: 2.5 m The movable liquid tank 1 (internal volume), a diameter: 1.4 m, a height: 2.5 m (a water filling amount: 600 kg)

The float 62 (internal volume), a diameter: 0.76 m, a height: 1.0 m (buoyancy force: −450 kg), return effective buoyancy force: −50 kg A movable mass body's own weight (including a drainage tube, a weight, and others): −400 kg A ball spring effective length D: 1.0 m The outer tank 61

The movable water tank surrounding portion 68, a cylindrical shape, a diameter: 1.5 m, a height: 1.4 m The float surrounding portion 67, a cylindrical shape, a diameter: 0.87 m, a height: 2.1 m The drainage tank 53, a discoid shape, a diameter: 1.5 m, a height: 0.35 m A used amount of water: 0.6 $m^3$/minute (introduced from the outside)

The operation is carried out for 1 minute/process and, in this time period, a time for generating electricity is 45 seconds, a mass body return time is 15 seconds, and generation of electricity which is up to approximately 3 kW at the time of electricity generation and up to approximately 2 kW on an average can be expected.

[Specification Example 2 of Liquid Power Generation Apparatus Lg]

In Specification Example 1 described above, the water discharged into the drainage tank 53 is further pumped up and supplied into the liquid feed tank 31, and this water is recycled based on hydrological circulation.

Timing of an electricity generating operation of the liquid power generation apparatus in each of Specification Examples 1 and 2 of the liquid power generation apparatus LG will now be explained with reference to timing charts shown in FIGS. 11(a) and (b). It is to be noted that (a) in FIG. 11 is a timing chart of Specification Example 1, and (b) in the same is a timing chart of Specification Example 2. In each of the examples, a configuration of the timing chart is as follows. That is, the first line in the table shows "OPERATION CYCLE" and "FIRST TIME" to "FIFTH TIME" from the left end toward the right side. In the second line, from the left, "TIME UNIT (15 seconds)" means that a time unit is 15 seconds, and an elapse order of the time units "1" to "20" is shown toward the right side. In the third line, "WATER SUPPLY" at the left end represents water supply to the movable water tank, and water supply to the movable water tank is performed in each time unit having a sign O in a column corresponding to one in the elapse order "1" to "20" of the time units which continues to the right side. In the fourth line, "GENERATION (FALLING)" at the left end represents that electricity is generated when the movable water tank moves down, electricity generation is executed in each time unit having a sign O in a column corresponding to one in the elapse order "1" to "20" of the time units which continues to the left side. In the sixth line, "WATER CIRCULATION" is executed in each time unit having a sign O in a column corresponding to the left side. In the fifth line, "Drainage" at the left end represents drainage of the water in the outer tank, and the water is drained in each time unit having a sign O in a column corresponding to one in the elapse order "1" to "20" of the time units which continues to the left side. Further, one operation cycle is one minute, this cycle is divided into four time units each of which corresponds to 15 seconds for convenience of explanation, and a series of operations including the water supply to the movable liquid tank, the fall of the movable liquid tank and the generation of electricity, and the drainage of water in the outer tank are carried out.

In each of Specification Example 1 in FIG. 11(a) and Specification Example 2 in FIG. 11(b), in the first operation cycle, the water is supplied to the movable liquid tank during the unit time (15 seconds), and electricity is generated during the subsequent three unit times (45 seconds). Furthermore, the drainage of water in the outer tank and the supply of water to the movable liquid tank are concurrently carried out during the first unit time (15 second) in the subsequent operation cycle.

Moreover, in Specification Example 2, a half of the water drained from the outer tank 61 into the drainage tank 53 is circulated to the liquid feed tank 31 using the circulation pump P, and electricity is generated while recycling the water. It is to be noted that, as shown in FIG. 11(b), if pumping-up using the circulation pump P is continuously performed, low power can suffice. Therefore, an amount of water newly introduced from the outside for generation of electricity, i.e., water consumption becomes a half of that in Specification Example 1(a).

[Fifth Embodiment of Liquid Power Generation Apparatus]

A configuration of a fifth embodiment of the liquid power generation apparatus LG according to the present invention will now be described with reference to FIG. 12 and FIG. 13. It is to be noted that like reference numerals denote parts equal to those in FIG. 1 to FIG. 5, and a detailed description will be omitted. This embodiment is the same as the fourth embodiment in that the above-described problems of the present invention are solved, a liquid is introduced into a movable liquid tank 1 and electricity is generated in order to assure a desired mass for generation of electricity at the time of generating electricity, then the liquid discharged to the inside of an outer tank 61 is used for facilitating returning the movable liquid tank 1 to its original upper position, and an amount of the liquid used for generation of electricity can be reduced while maintaining a desired electricity generating capacity, but a different configuration is adopted.

That is, in this embodiment, the movable liquid tank 1 and a float 62 are closely contact with each other in the vertical direction like the first embodiment shown in FIG. 1 to FIG. 4, and the outer tank 61 has a tube shape whose transverse cross-sectional area and shape are unchanged along the vertical direction. Additionally, like the second embodiment, electricity is generated only when the movable liquid tank 1 moves down. Despite this conformation, the movable liquid tank 1 is configured to be moved up to its original position after the downward movement by using the liquid discharged from the movable liquid tank 1. This point will be mainly described in detail hereinafter.

A linear-rotation conversion mechanism 2 is a ball spring, and it is set in such a manner that its effective length becomes equal to a moving distance of the movable liquid tank 1 in the vertical direction. The movable liquid tank 1 is considered so that its internal cross-sectional area can approximate an internal cross-sectional area of the outer tank 61 and a gap between these members can be reduced as much as possible without obstructing the smooth vertical movement of the movable liquid tank 1. In the illustrated embodiment, in the linear-rotation conversion mechanism 2, a support 27 is connected to a lower end of a male screw shaft 21 of the ball screw through a bearing 23. Further, the male screw shaft 21 is rotatably supported by the bearings 22 and 23. A proximal end of the support 23 is planted from a bottom portion of the outer tank 61 so as to disable rotational movement. A linear motion bearing 28 is arranged on an outer periphery of the support 27 so as to enable its free linear motion, and the linear motion bearing 28 is fixed to the float 62. As a result, a movable mass body M is supported by a female screw body 22 of the ball screw fixed to the upper portion of the movable liquid tank 1 and the linear motion bearing 28 in such a manner that the movable mass body M can freely move in the vertical direction.

The float 62 is set to have buoyancy force −B that exceeds a mass m of the movable mass body M when it floats on the discharged liquid. However, a part of the float 62 corresponding to the mass m of the movable mass body M is immersed in the discharged liquid when the float 62 floats, the liquid enters a gap between a lower portion surrounding portion of the float 62 and an inner wall of the outer tank 61, and hence a size of guiding means 61a is relatively slightly large so that the float 62 can smoothly move up even on this occasion. On the other hand, since the liquid does not enter a surrounding part of the movable liquid tank 1 during its upward movement, a size of the guiding means 61a' can be relatively reduced.

As a relationship between a mass Q (kg) of the liquid (which is mainly water) introduced into the movable liquid tank 1, the mass m (kg), i.e., a weight of the movable mass body M itself, and an absolute value B of the buoyancy force −B (kg) of the float 62 for the liquid, the same conditions as those in the fourth embodiment (Expressions 1 and 2) correspond. Furthermore, in addition to these conditions, meeting the following condition of Expression 3 is preferable. That is, assuming that H (m) is a height dimension of an internal volume of the movable liquid tank 1 and D (m) is a downward moving distance of the movable liquid tank 1, the following Expression 3 is met.

$$H \geq D \quad \text{(Expression 3)}$$

In Expression 3, if the downward moving distance D of the movable liquid tank 1 exceeds the height dimension H of the internal volume of the movable liquid tank 1, the movable liquid tank 1 cannot be returned to its original upper position. If the falling distance D is not greater than the height dimension H of the internal volume of the movable liquid tank 1, the stagnant liquid supplements insufficiency of the liquid based on a difference between these values and the movable liquid tank 1 can be returned to its original upper position as will be described later even though the internal cross-sectional area of the outer tank 61 is larger than the internal cross-sectional area of the movable liquid tank 1 to some extent. Therefore, in this embodiment, when the effective length of the linear-rotation conversion mechanism 2 is set equal to or larger than the height dimension H of the internal volume of the movable liquid tank 1, electricity can be effectively generated across the entire falling distance of the movable liquid tank 1. However, when the effective length of the linear-rotation conversion mechanism 2 is less than the dimension H, electricity cannot be generated across the entire falling distance. Furthermore, although electricity can be generated across the entire falling length when the effective length of the linear-rotation conversion mechanism 2 is longer than the dimension H, not only a portion exceeding the dimension H cannot contribute to generation of electricity but also it is useless for a cost of the liquid power generation apparatus LG and a size of the apparatus, which is not preferable.

Another characteristic part of the configuration in this embodiment lies in that a stagnant liquid (stagnant water) L is previously stored in the inner bottom portion of the outer tank 61 at the time of at least discharging the liquid from the movable liquid tank 1. This stagnant liquid L enters a gap formed between the outer tank 1 and the float 62 when the movable liquid tank 1 reaches the predetermined lower position. When the stagnant liquid L is added to the discharged liquid in this manner, a liquid level height equivalent to a liquid level height of the liquid at a time of introduction into the movable water tank 1 can be reproduced in the outer tank 1 having a larger area than an area of the movable liquid tank 1. Therefore, when both the discharged liquid and the stagnant liquid L act on the float 62, the movable liquid tank 1 can be returned to its original upper position.

Moreover, when the lower portion of the float 62 enters the stagnant liquid L immediately before the movable liquid tank 1 of the movable mass body M reaches the predetermined lower position, the stagnant liquid L is pushed up, enters the gap between the outer tank 61 and the float 62, and allows the buoyancy force to act on the float 62. As a result, a strong braking operation acts on the float 62, and impact shock at the time of the entrance is alleviated. That is, the stagnant liquid L also acts as a buffer with respect to the movable mass body M. Furthermore, when the movable mass body M gently stops when it reaches the predetermined down position. Therefore, the movable portion of the liquid power generation apparatus LG, especially the linear-rotation conversion mechanism 2 or the movable liquid tank 1 can be prevented from being deformed or damaged due to impact shock at the time of stop. It is to be noted that the electricity generating capacity is reduced when the buffering action is exerted, but this reduction recedes in a very short time, and hence the reduction in electricity generating capacity can be suppressed to a negligible level.

Any other structure in this illustrated embodiment will now be described.

Each of the movable liquid tank 1, the float 62, and the outer tank 61 has a rectangular parallelepiped shape, and the entire liquid power generation apparatus LG is laid out so as to form a substantially rectangular parallelepiped shape. It is to be noted that, in a plan view of FIG. 13, an outline of the outer tank 61 in a planar view is indicated by a dotted line. The linear-rotation conversion mechanism 2 is arranged at a position of the center of gravity of the movable liquid tank 1 and the float 62. Since each of the later-described liquid feed tank 31 and the drainage tank 53 is formed into a rectangular parallelepiped shape, it is possible to obtain the liquid power generation apparatus LG which can be easily molded and has the excellent installation properties.

Since the liquid does not enter the gap between the movable liquid tank 1 and the outer tank 61, the guiding means 61a' may be properly downsized. On the other hand, since the liquid enters the gap between the float 62 and the outer tank 61, the guiding means 61a is properly large in size in order to enhance a guiding operation.

Figure 12:
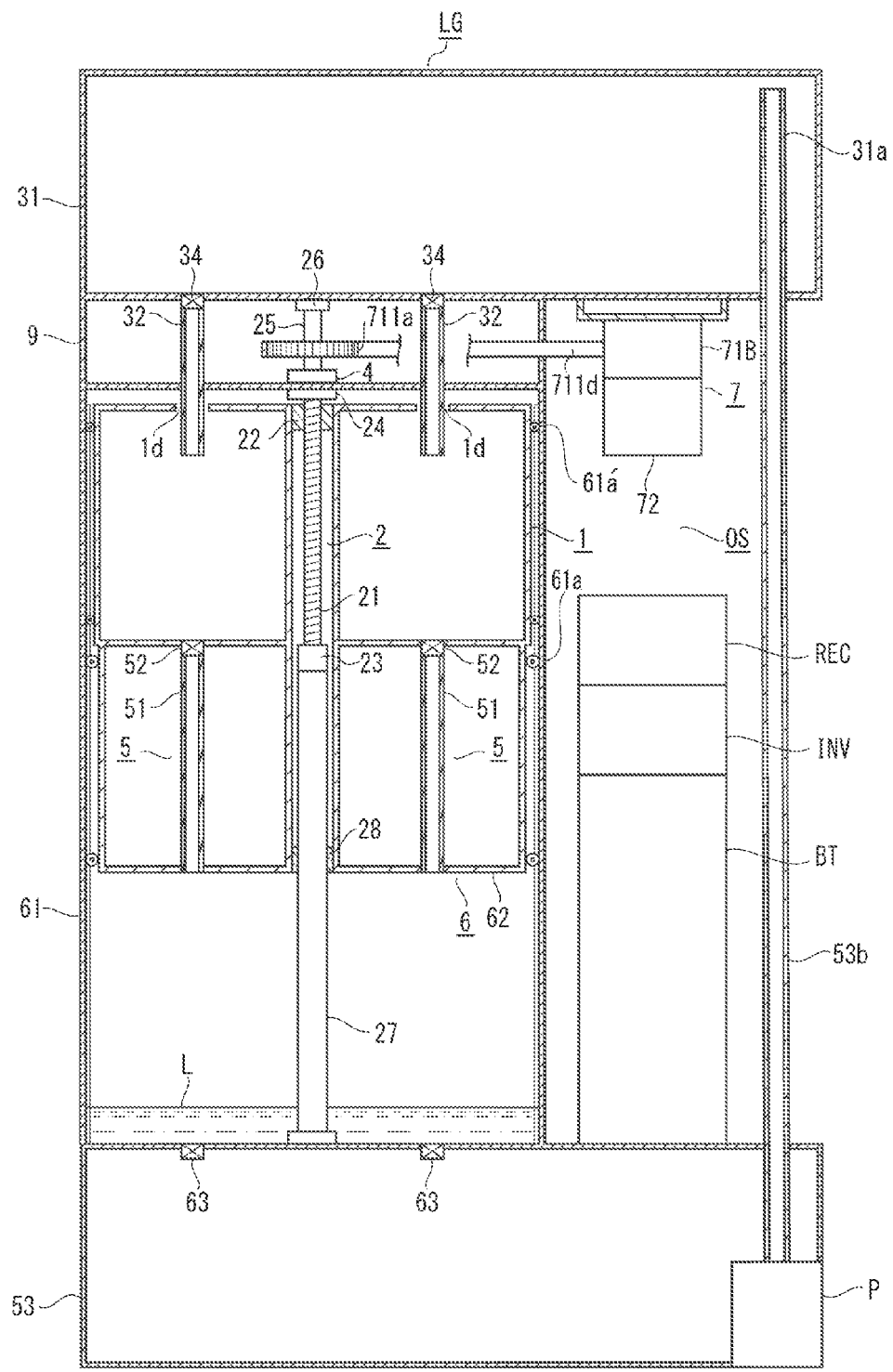
FIG. 12 is a front longitudinal cross-sectional view according to a fifth embodiment of a liquid power generation apparatus of the present invention.
Figure 13:
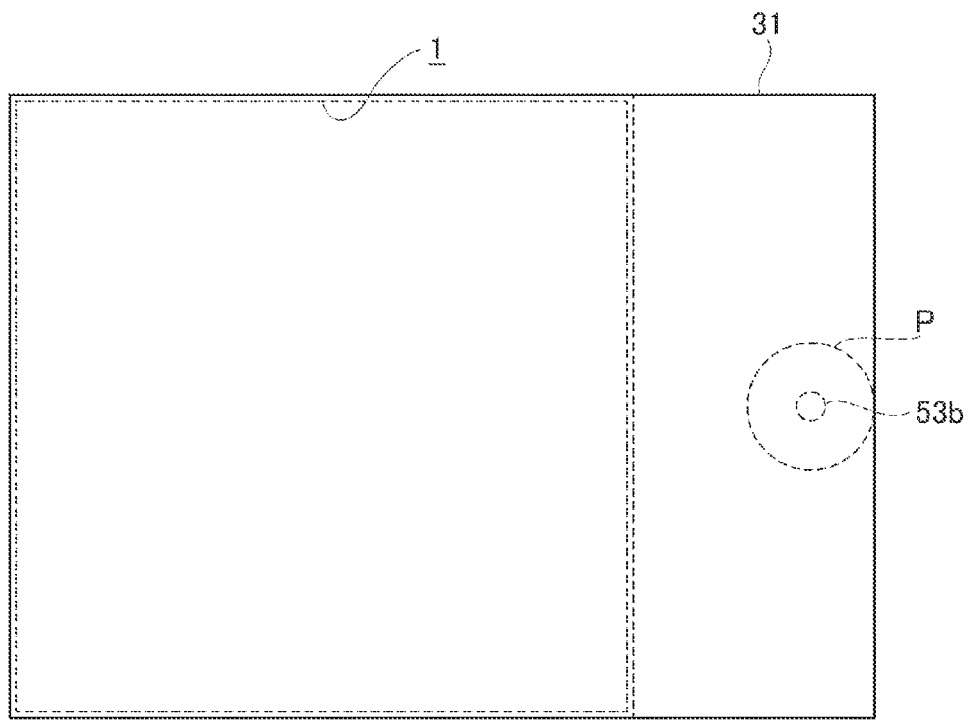
FIG. 13 is a plan view according to the same.

Moreover, when a width dimension of each of the liquid feed tank 31 and the drainage tank 53 protrudes toward the right side in, e.g., FIG. 12 beyond the width of the outer tank 1, an external member space OS in which a set of electricity-related incidental facilities such as a generator main body 72, a rectifying unit REC, an inverter unit INV, and a battery unit BT can be placed to be adjacent to the outer tank 61 can be formed, and the electrical circuit facilities can be arranged in this external member space OS, and the entirely integrated liquid power generation apparatus LG can be configured.

Additionally, it is easy to suppress a height dimension of each of the liquid feed tank 31 and the drainage tank 53 to be equal to, e.g., the movable liquid tank 1 and increase an inner volume of the same beyond that of the movable liquid tank 1. As a result, when a storage amount of the liquid used for generation of electricity in each of the liquid feed tank 31 and the drainage tank 53 is set larger than an amount used for one electricity generation cycle without increasing the height of the liquid power generation apparatus LG, even though asynchronism occurs between the electricity generating operation, the liquid feeding operation, and the liquid draining operation within the allowable range, the smooth electricity generating operation and the circulating operation of a part or all of the liquid to be used can be carried out.

The circulation pump P is constituted of a submersible pump put in the drainage tank 53. The liquid emitted from the circulation pump P is pushed up to the liquid feed tank 31 through a circulation path 53b. Further, an end of the circulation path 53b liquid-tightly enters from a bottom surface of the liquid feed tank 31, and circulation into the liquid feed tank 31 is effected from an inflow tube 31a that is opened to an inner top portion of the liquid feed tank 31 to allow overflow.

The generator main body 72 is constituted of an alternating-current generator, and it is arranged together with an accelerator 713 in the external space OS of a casing 9. Furthermore, an input end of the accelerator 713 is connected to a rotary shaft 25 through a gear 711a and a timing belt 711d so as to achieve torque transmission. It is to be noted that an output from the generator main body 72 is rectified by the rectifying unit REC, and the battery unit BT is charged with this output. In case of operating a load with generated electricity, an output from the battery unit BT is converted into an alternating current by the inverter unit INV, and then the converted current is supplied to the load. It is to be noted that, when a direct-current generator is used as the generator main body 72, the rectifying unit REC can be omitted.

A calculation example of a primary specification of the liquid power generation apparatus LG according to the fifth embodiment shown in FIG. 12 will now be described. It is to be noted that the liquid to be used is water.

[Specification Example 3 of Liquid Power Generation Apparatus Lg]

A rectangular shape, a width: 1.5 m, a depth: 1 m, a height: 2.9 m

The liquid feed tank 31, a rectangular parallelepiped shape, a width: 1.5 m, a depth: 1.0 m, a height: 0.4 m A generator mechanism portion, a mass: 1000 kg, a rectangular parallelepiped shape, a width: 1.0 m, a depth: 1.0 m, a height: 1.27 m The movable liquid tank 1 (internal volume), a width: 0.9 m, a depth: 0.9 m, a height: 0.75 m (a water filling amount: 600 kg)

The float 62 (internal volume), a width: 0.9 m, a depth: 0.9 m, a height: 0.52 m (buoyancy force: −420 kg), return effective buoyancy force: −20 kg A movable mass body's own weight (including a drainage tube, a weight, and others): 400 kg A ball spring effective length D: 0.75 m The outer tank 61, a width: 0.95 m, a depth: 0.95 m, a height: 2.1 m The drainage tank 53: a rectangular parallelepiped shape, a width: 1.5 m, a depth: 1.0 m, a height: 0.4 m A used amount of water: 0.8 m$^3$/minute (introduced from the outside)

The operation is carried out for 45 seconds/process and, in this time period, a time for generating electricity during falling is 33.75 seconds, a movable mass body rising time is 11.25 seconds, and generation of electricity which is slightly smaller than Specification Examples 1 and 2 can be expected.

[First Embodiment of Liquid Power Generation System]

A first embodiment of a liquid power generation system according to the present invention will now be described hereinafter. As an outline of this embodiment, a plurality of, e.g., three liquid power generation apparatuses LG according to the first embodiment described with reference to FIGS. 1 to 4 are directly connected as shown in the drawing by using their primary portions so that a liquid can serially flows, and the plurality of liquid power generation apparatuses LG are used to constitute a liquid power generation system which is compact and operates efficiently.

Figure 14:
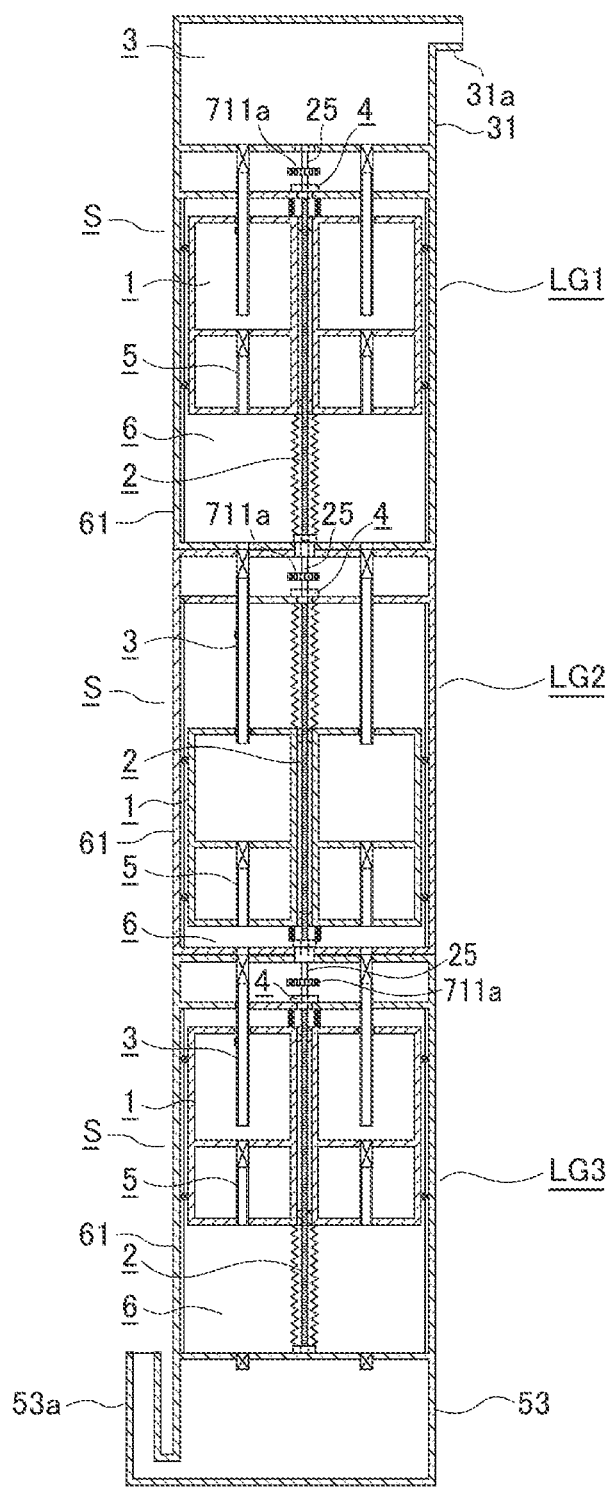
FIG. 14 is a front longitudinal cross-sectional view according to a first embodiment of a liquid power generation system of the present invention.

That is, in FIG. 14, reference sign LG1 denotes a liquid power generation apparatus in a first stage, and reference sign LG2 and reference sign LG3 likewise denote liquid power generation apparatuses on a second stage and a third stage, respectively.

As can be understood from a comparison with FIG. 1, a drainage tank 53 is removed from the liquid power generation apparatus LG1 on the first stage. Both a liquid feed tank 31 and the drainage tank 53 are removed from the liquid power generation apparatus LG2 on the second stage. The liquid feed tank 31 is removed from the liquid power generation apparatus LG3 on the third stage.

When the liquid is first introduced into a movable liquid tank 1 from an upper tank 31, the liquid power generation apparatus LG1 on the first stage is the first apparatus that starts generation of electricity. Further, a bottom portion of an outer tank 61 of the liquid power generation apparatus LG1 on the first stage is directly connected to a bottom plate portion of the upper tank 31 of the liquid power generation apparatus LG2 on the second stage. Therefore, a magnetic valve 63 on the bottom portion of a stationary liquid tank 61 of the liquid power generation apparatus LG1 on the first stage is removed, and the magnetic valve 63 shown in FIG. 1 that is arranged on the bottom portion of the outer tank 61 of the liquid power generation apparatus LG2 on the second stage is removed, but a magnetic valve 34 shown in FIG. 1 in the liquid power generation apparatus LG2 on the second stage also functions as the magnetic valve 63. Therefore, in the liquid power generation apparatus LG1 on the first stage, when drainage is performed in the outer tank 61, which operation immediately serves as wafer supply to the movable liquid tank 1 in the liquid power generation apparatus LG2 on the second stage. As a result, the introduction of the liquid into the movable liquid tank 1 becomes faster, and hence a pause time of electricity generation that is produced at the time of the introduction can be shortened.

Since the liquid after electricity is generated in the liquid power generation apparatus LG1 on the first stage is ongoingly introduced into the liquid power generation apparatus LG2 on the second stage, this apparatus LG2 is the second apparatus that generates electricity. Furthermore, like a configuration of connection of the liquid power generation apparatus LG1 on the first stage and the liquid power generation apparatus LG2 on the second stage, the magnetic valve 34 shown in FIG. 1 of the liquid power generation apparatus LG3 on the third stage also functions as the magnetic valve 63 shown in FIG. 1 of the liquid power generation apparatus LG2 on the second stage. Therefore, its operations and effects are the same as those described above. It is to be noted that the movable liquid tank 1 of the liquid power generation apparatus LG2 on the second stage moves down in FIG. 14, and this situation is shown in order to make the state of downward movement of the movable liquid tank 1 understandable but, in an actual electricity generating operation, when the movable liquid tank 1 of the liquid power generating apparatus LG1 on the first stage moves up, the liquid power generation apparatus LG2 on the second stage is delayed in terms of time but likewise moves up.

Since the liquid after electricity is generated in the liquid power generation apparatus LG2 on the second stage is ongoingly introduced into the liquid power generation apparatus LG3 on the third stage, this apparatus LG3 is the last apparatus that generates electricity. Moreover, for the same reason as that described above, the discharged water from the liquid power generation apparatus LG2 on the second stage is immediately introduced into the movable liquid tank 1 in the liquid power generation apparatus LG3 on the third stage, and hence the same operations and effects as those described above are exercised. When generation of electricity performed at the time of upward movement is finished after the downward movement of the movable liquid tank 1, the magnetic valve 63 shown in FIG. 1 is turned on (opened), the water is discharged into the drainage tank 53, and hence the water is drained to the outside.

Figure 15:
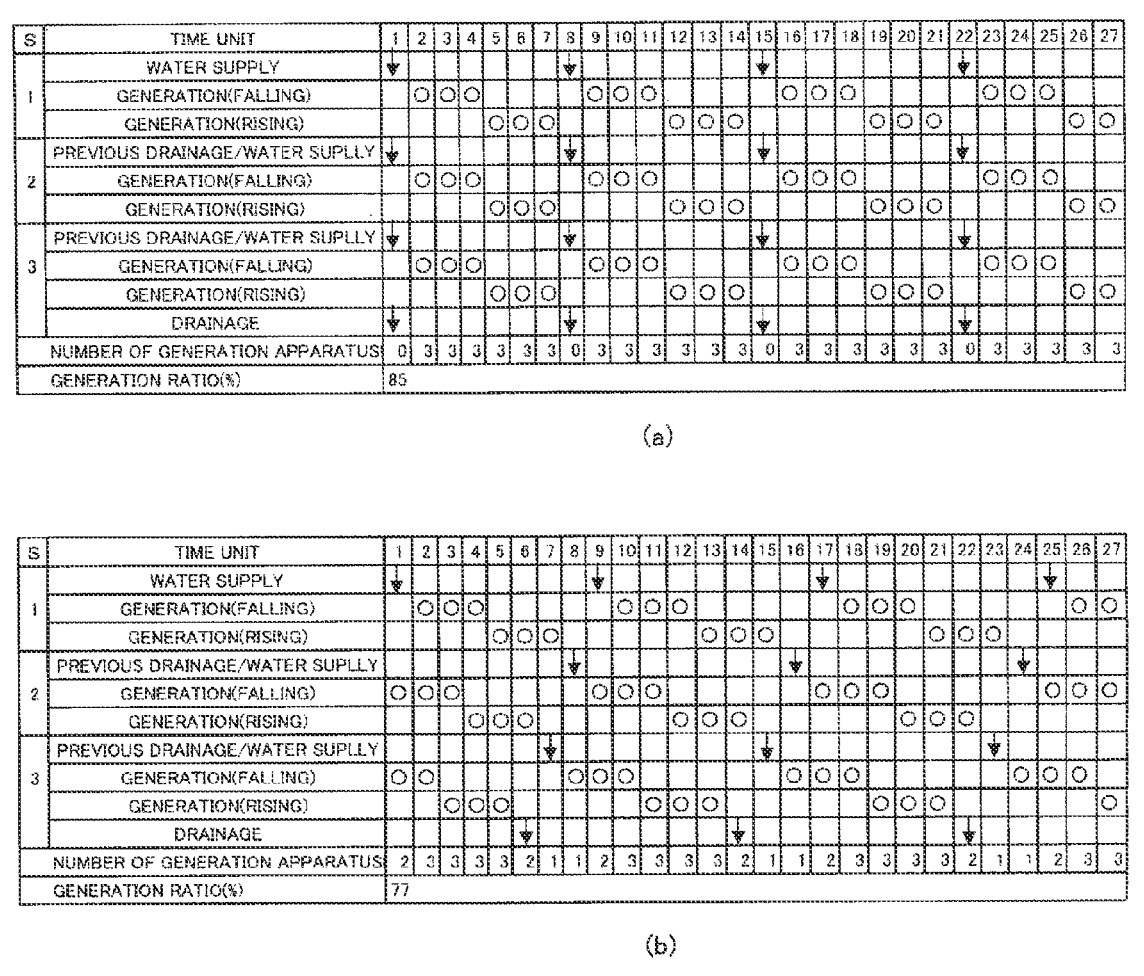

Timing of operations in the first embodiment of the liquid power generation system will now be described with reference to timing charts shown in FIGS. 15(*a*) and (*b*). (a) shows operation timing in an operation mode that subsequent water supply to the movable liquid tank 1 is started immediately after the movable liquid tank 1 is restored from the falling state and moves up to its original position, and (b) shows operation timing in an operation mode that subsequent water supply is started when one unit time elapses immediately after the movable liquid tank 1 is restored from the falling state and moves up to its original position. In the example of FIG. 15, a water supply time with respect to the movable liquid tank 1 is set to ⅓ of each of falling and rising times for the sake of explanation, but it can be actually further shortened.

In addition, in each table shown in FIG. 15, in the first line, "S", "TIME UNIT", and numbers "1" to "27" are shown from the left end toward the right side. Additionally, in the first column, stage numbers "1" to "3" of the three liquid power generation apparatuses are shown below "S". "S" represents the stage number of the liquid power generation apparatus, and each stage number is shown below this sign "S". Further, in the second column, a process that is performed by the liquid power generation apparatus on each stage is shown below "Time UNIT". That is, in the liquid power generation apparatus on the first stage, "WATER SUPPLY", "GENERATION (FALLING)", and "GENERATION/RISING" are carried out. In the liquid power generation apparatus on the second stage, "PREVIOUS DRAINAGE/WATER SUPPLY", "GENERATION (FALLING)", and "GENERATION/RISING" are performed. In the liquid power generation apparatus on the third stage, "PREVIOUS DRAINAGE/WATER SUPPLY", "GENERATION (FALLING)", "GENERATION/RISING", and "DRAINAGE" are carried out. In these processes, "WATER SUPPLY" represents a water introduction process for the movable liquid tank 1 from the liquid feed tank 38, "GENERATION (FALLING)" represents a process that electricity is generated when the movable liquid tank 1 moves down, "GENERATION (RISING)" represents a process that electricity is generated when the movable liquid tank 1 moves up, "PREVIOUS DRAINAGE/WATER SUPPLY" represents a process that drainage of the outer tank 61 on the previous stage and water supply on the current stage are simultaneously performed, and "DRAINAGE" represents drainage to the drainage tank 53 on the last stage (the third stage), respectively. On the other hand, the time unit represents the order of elapse of the time units "1" to "27", each of which has the same time period, toward the right side of the table. "NUMBER OF GENERATORS" in a 12th line represents the number of the liquid power generation apparatuses that generate electricity in the unit time, and "GENERATION RATIO (%)" represents % of the number of unit times during which electricity is generated in the entire unit times when the unit times 1 to 27 is determined as 100%. "↓" shown in a column placed at each intersecting point of a column of the time units 1 to 27 and a line of water supply, previous drainage/water supply, and drainage represents that the process of water supply and/or drainage is carried out, and "O" represents the process of generation of electricity, respectively. Therefore, if three signs O are continuously shown in the electricity generation process, this means that electricity is generated during a time which is triple the unit time.

As can be understood from FIG. 15, in case of the operation mode (a), since a water supply cycle is seven time units and the liquid power generation apparatuses on the first to third stages simultaneously operate, a pause time of one time unit is produced between contiguous operations. Therefore, the operation becomes intermittent, but the generation ratio during generation of electricity is constantly fixed and a maximum value, and an electricity generating capacity becomes maximum. It is to be noted that charging a battery or a capacity with generated electricity enables continuously supplying electricity to a load, and hence no problem occurs.

On the other hand, in case of the operation mode (b), since the water supply cycle is eight time units and the liquid power generation apparatuses on the first to third stages operate while staggering operation times, an electricity generating capacity fluctuates, and a generation ratio is slightly reduced, but the liquid power generation system can continuously generate electricity. It is to be noted that, when the cycle of water supply, i.e., introduction of the liquid from the outside with respect to the liquid power generation apparatus LG1 on the first stage is prolonged and a time lag when the liquid power generation apparatuses on the first to third stages operate, i.e., the water supply cycle is increased, the generation ratio is lowered.

As described above, since the first embodiment of the liquid power generation system repeatedly performs the above-described operation and has the configuration that the liquid power generation apparatuses LG on the plurality of stages are directly connected in series, this system has an advantage that a necessary head of the liquid required for the operation can be remarkably reduced. Furthermore, the system is characterized in simplicity that a special head does not have to be provided when water is supplied to the liquid power generation apparatus LG1 on the first stage. Moreover, since multistage electricity generation is carried out, an excellent advantage, i.e., high generation efficiency can be obtained.

[Second Embodiment of Liquid Power Generation System]

A second power embodiment of a liquid power generation system will now be described with reference to FIG. 6.

According to this embodiment, a liquid is alternately distributed and introduced to two liquid power generation apparatuses LG and LG arranged in parallel, whereby the two liquid power generation apparatuses LG and LG installed on the same level alternately perform an electricity generating operation.

That is, the two liquid power generation apparatuses LG and LG may have equal or unequal configurations. Additionally, it is possible to adopt a configuration different from that shown in FIG. 6, e.g., a configuration shown in FIG. 1 to FIG. 4 or a configuration shown in FIG. 5. However, since a later-described liquid distributor 8 is used, amounts of the liquid used for generating electricity must be equalized. Further, two drainage tanks 53 and 53 communicating with the two liquid power generation apparatuses LG and LG in common are provided.

The liquid distributor 8 is pumping means having a distributing function for alternately supplying the liquid in the drainage tanks 53 and 53, in which the liquid discharged from the liquid power generation apparatuses LG and LG are stored, to liquid feed tanks 31 and 31 of the liquid power generation apparatuses LG and LG.

In this embodiment, the two liquid power generation apparatuses LG and LG alternately operates. That is, the operation is as follows.

1. In a state that the liquid is supplied from a non-illustrated liquid source to the liquid feed tank 31 of one, e.g., the left liquid power generation apparatus LG in FIG. 6 through an inflow tube 31*a*, when a magnetic valve 34 is turned on (opened) by liquid introducing means 3, a predetermined amount of the liquid is introduced into a movable liquid tank 1 as described above.

2. When a magnetic brake is opened by controlling means 4, the movable liquid tank 1 starts downward movement, a linear-rotation conversion mechanism 2 generates a rotation output, i.e., torque, and a generator 7 generates electricity.

3. When the movable liquid tank 1 moves down to a predetermined position together with a float 62, the liquid in the movable liquid tank 1 is discharged into an outer tank 61 through a discharge tube 51 by liquid tank returning means 6, the float 62 floats on a liquid level with large buoyancy force as the liquid level rises, then the movable liquid tank 1 connected to the float 62 also moves up, the linear-rotation conversion mechanism 2 generates a rotation output, i.e., torque, and the generator 7 generates electricity until the movable liquid tank 1 returns to its original position and stops.

4. When the movable liquid tank 1 returns to its original position and stops, a magnetic valve 63 of liquid discharging means 5 is turned on (opened), and the liquid in the movable liquid tank 1 is discharged to the inside of the drainage tank 53. The discharged liquid is processed by the liquid distributing means 8. Furthermore, the discharged liquid is introduced into the liquid feed tank 31 through an inflow tube 31*a* of the other liquid power generation apparatus LG on the right side in FIG. 6, and generation of electricity at the time of the downward movement and the upward movement of the movable liquid tank 1 is carried out in the same order as that described above.

5. All or a part of an amount of the liquid required for generation of electricity may be used for recycle based on distribution of the discharged liquid subjected to generation of electricity performed by the liquid distributing means. In the latter case, the liquid can be newly distributed and supplied from a non-illustrated liquid source every time the generating operation is carried out.

What is claimed is:

1. A liquid power generation apparatus comprising:
   a movable liquid tank which is vertically movable;
   a linear-rotation conversion mechanism which comprises a male screw shaft and a female screw body screwed to the male screw shaft, one of the male screw shaft and the female screw body being displaced in an axial direction in tandem with the movable liquid tank, the other generating a rotation output;
   liquid introducing means for introducing a liquid into the movable liquid tank when the movable liquid tank is placed at an upper position;
   controlling means for lowering the movable liquid tank having the liquid introduced therein from the upper position;
   liquid discharging means for discharging the liquid in the movable liquid tank when the movable liquid tank is lowered;
   movable liquid tank returning means for moving up the movable liquid tank, which has been lowered and has discharged the liquid, and returning it to its original position, the movable liquid tank returning means comprising: an outer tank which surrounds the movable liquid tank and stores the liquid that has been discharged from the movable liquid tank; and a float which allows the movable liquid tank to float on the discharged liquid; and
   a generator which is driven by a desired rotation output from the linear-rotary conversion mechanism and generates electricity.

2. The liquid power generation apparatus according to claim 1,
   wherein an inner bottom portion of the outer tank of the movable liquid tank returning means is provided with a stagnant liquid at least during the period in which liquid is being discharged from the movable liquid tank.

3. The liquid power generation apparatus according to claim 1,
   wherein the float is arranged at a position that is separated downward from a bottom portion of the movable liquid tank; and an area in a float surrounding portion of the outer tank in a planar view is set to be smaller than an area in the movable liquid tank in a planar view.

4. The liquid power generation apparatus according to claim 1,
   wherein the movable liquid tank and the float are integrated and constitute a movable mass body; and
   the outer tank surrounds the movable mass body in a movable range of the movable mass body from the outer side.

5. The liquid power generation apparatus according to claim 1, wherein the respective following conditions are simultaneously met:

$$0.4Q \leq m \leq Q \quad \text{(Expression 1)}$$

$$1.03m \leq B \leq 1.6m \quad \text{(Expression 2)}$$

where Q (kg) is a mass of the liquid introduced into the movable liquid tank, m (kg) is a weight of the movable mass body itself, and B is an absolute value of buoyancy force (−kg) of the float.

6. The liquid power generation apparatus according to claim 1,
   wherein the buoyancy force of the float for the liquid is so small that generation of electricity using the generator, which is substantially equal to that at the time of the downward movement, is impossible at the time of the upward movement of the movable liquid tank.

7. The liquid power generation apparatus according to claim 1,
   wherein the float also has buoyancy force that enables generation of electricity using the generator in addition to the buoyancy force that allows the movable liquid tank to float on the discharged liquid.

8. A liquid power generation system,
   wherein a plurality of liquid power generation apparatuses according to claim 1, are directly connected in an outer tank and perform multistage generation of electricity.

* * * * *